United States Patent [19]

Shinomiya

[11] Patent Number: 5,729,286
[45] Date of Patent: Mar. 17, 1998

[54] AUTOMATIC WHITE BALANCE REGULATING DEVICE HAVING INTERCHANGEABLE SYSTEMS

[75] Inventor: Kohji Shinomiya, Itami, Japan

[73] Assignee: Mitsubishi Denki Kabushiki Kaisha, Tokyo, Japan

[21] Appl. No.: 611,852

[22] Filed: Mar. 6, 1996

Related U.S. Application Data

[62] Division of Ser. No. 433,951, May 4, 1995, Pat. No. 5,528,373, which is a continuation of Ser. No. 176,015, Dec. 30, 1993, abandoned, which is a division of Ser. No. 954,044, Sep. 30, 1992, Pat. No. 5,298,980, which is a division of Ser. No. 644,559, Jan. 23, 1991, Pat. No. 5,185,658.

[30] Foreign Application Priority Data

Feb. 5, 1990 [JP] Japan ......................... 2-26802

[51] Int. Cl.$^6$ ......................................... H04N 9/73
[52] U.S. Cl. .............................. 348/224; 348/225
[58] Field of Search ............................ 348/223, 229, 348/265; H04N 9/73

[56] References Cited

U.S. PATENT DOCUMENTS

| | | |
|---|---|---|
| 4,682,210 | 7/1987 | Ikemura et al. |
| 4,739,392 | 4/1988 | Ueda et al. |
| 4,739,393 | 4/1988 | Seki et al. |
| 4,811,086 | 3/1989 | Hieda. |
| 5,185,658 | 2/1993 | Shinomiya .................. 348/224 |
| 5,298,980 | 3/1994 | Shinomiya .................. 348/224 |
| 5,528,373 | 6/1996 | Shinomiya .................. 348/224 |
| 5,563,656 | 10/1996 | Kyuma ........................ 348/223 |

*Primary Examiner*—Kim Vu
*Attorney, Agent, or Firm*—Oblon, Spivak, McClelland, Maier & Neustadt, P.C.

[57] ABSTRACT

An automatic white balance regulating device is provided with at least two of a color temperature sensor system, camera color signal processing system and a manual operating system which are selected by a system selector in accordance with a state of shooting circumstance. Thus, a white balance control signal of a system appropriate to the shooting situation is selected so that a white balance regulation can be appropriately performed in accordance with the shooting situation.

6 Claims, 30 Drawing Sheets

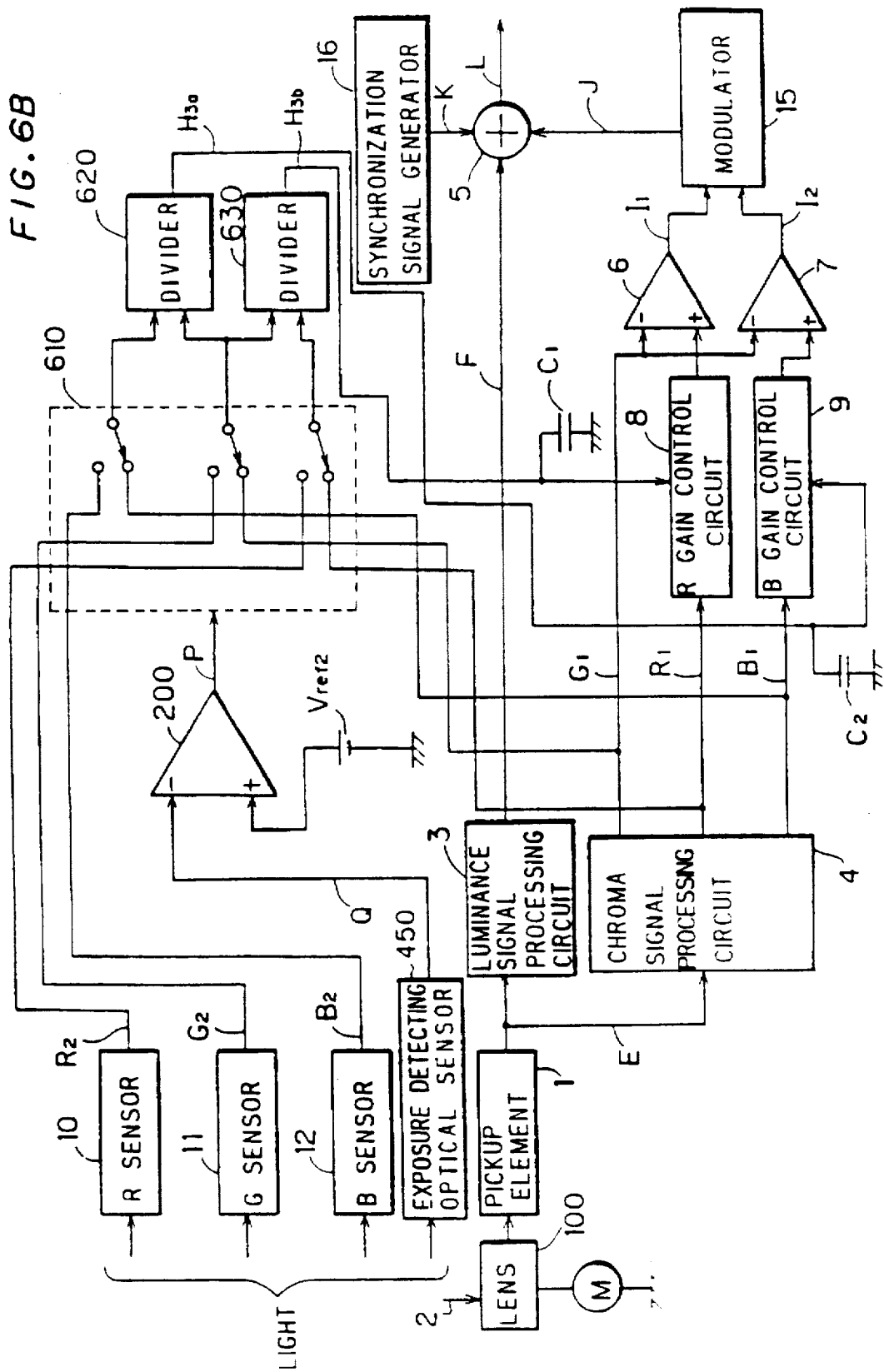

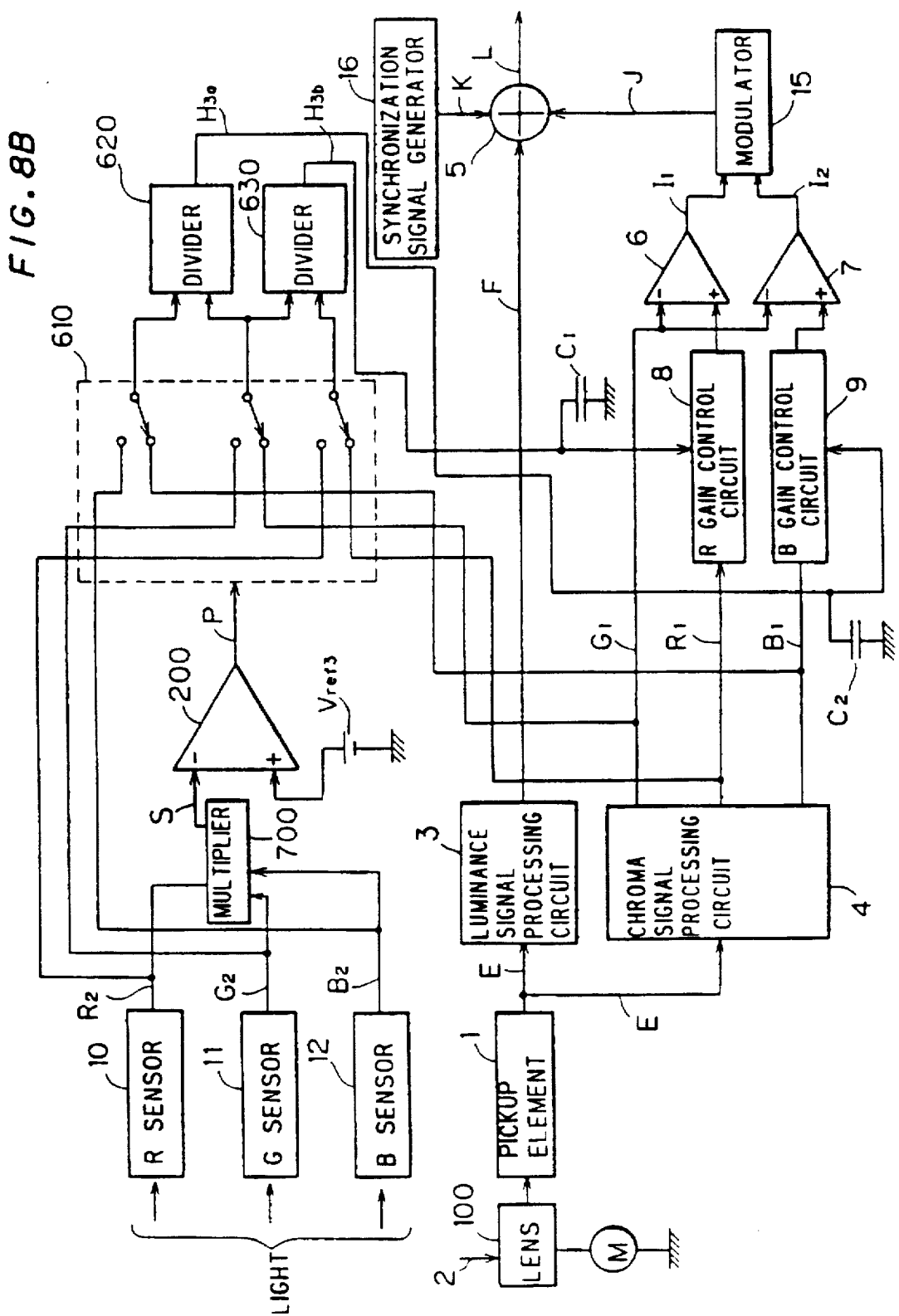

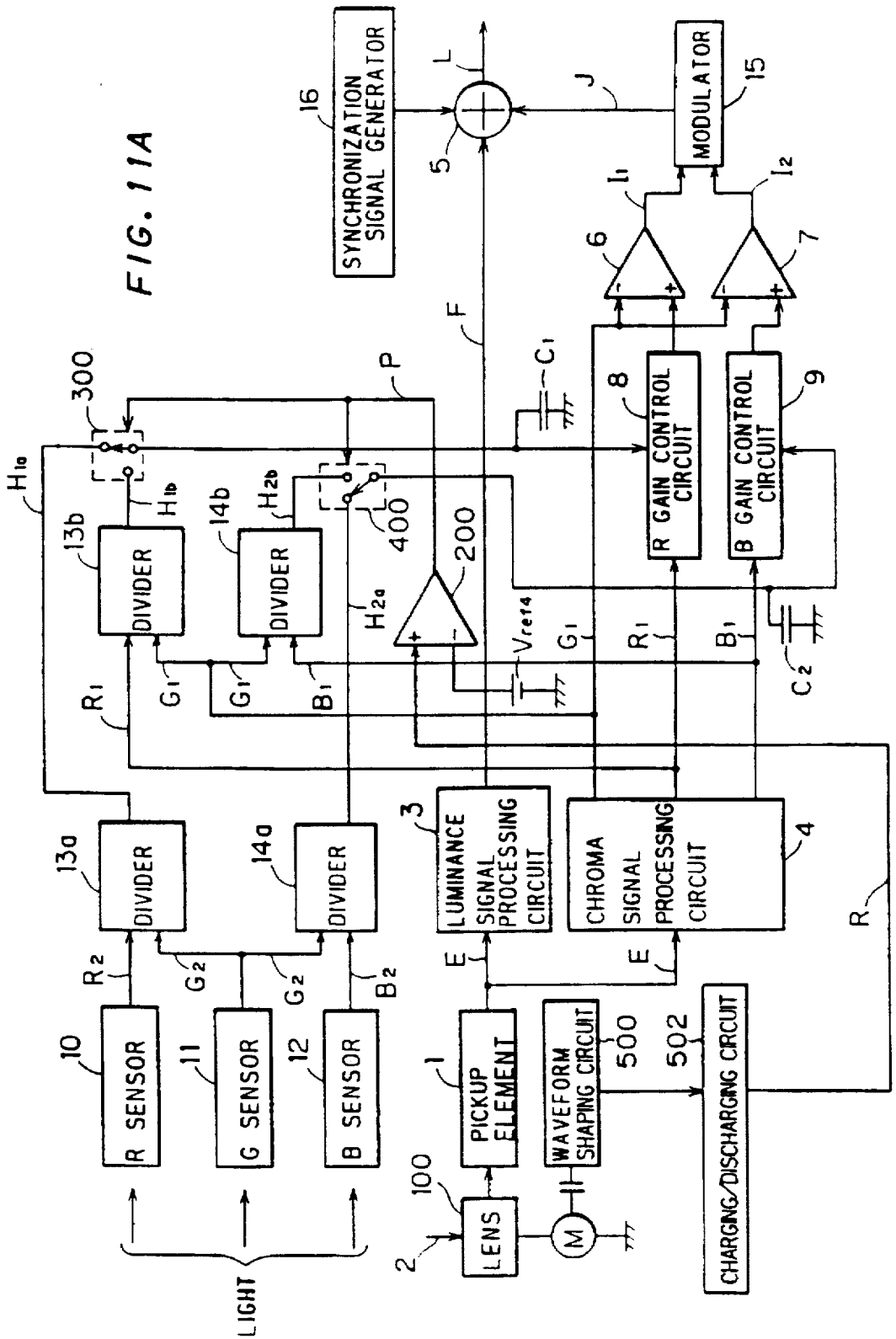

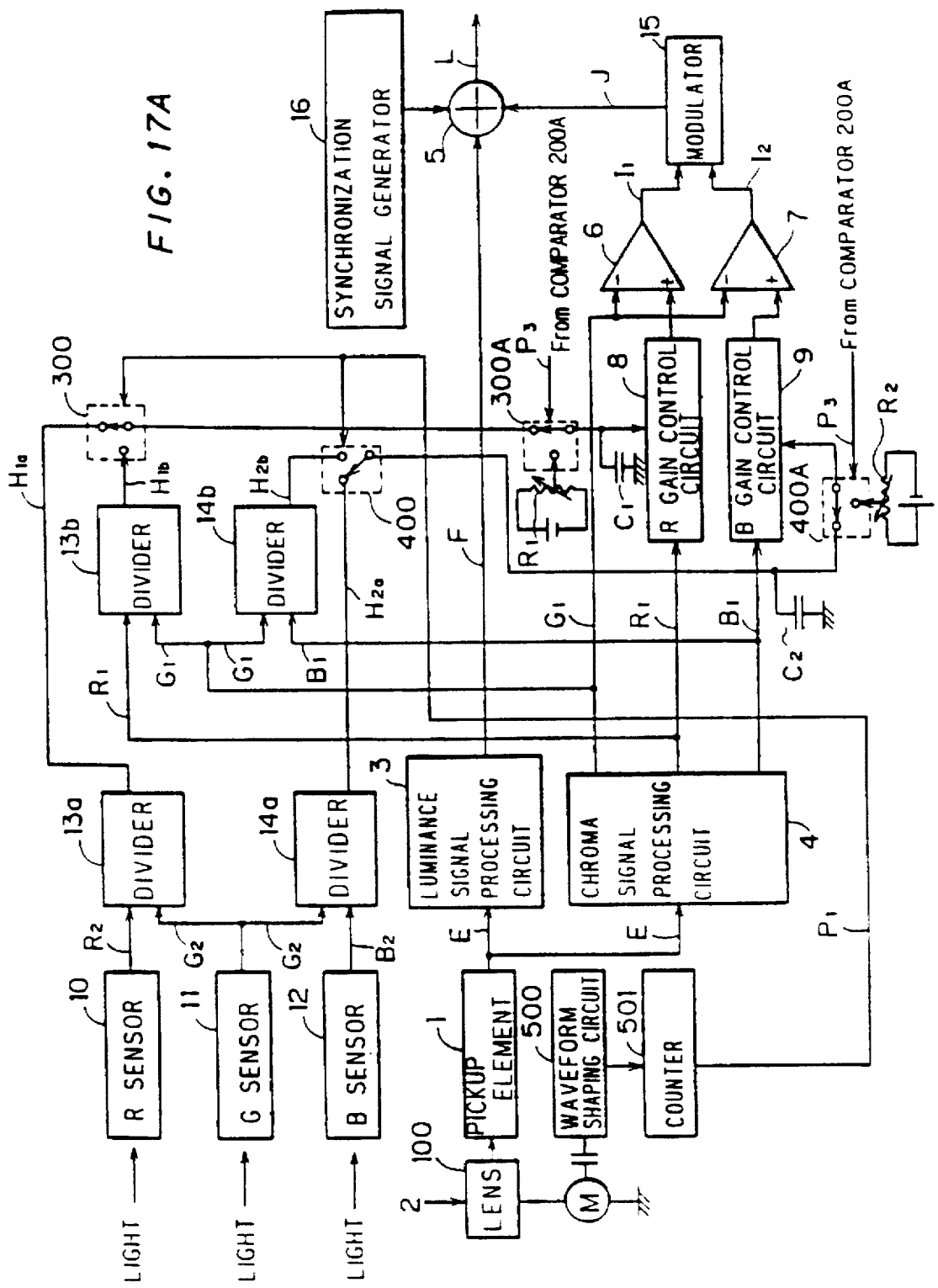

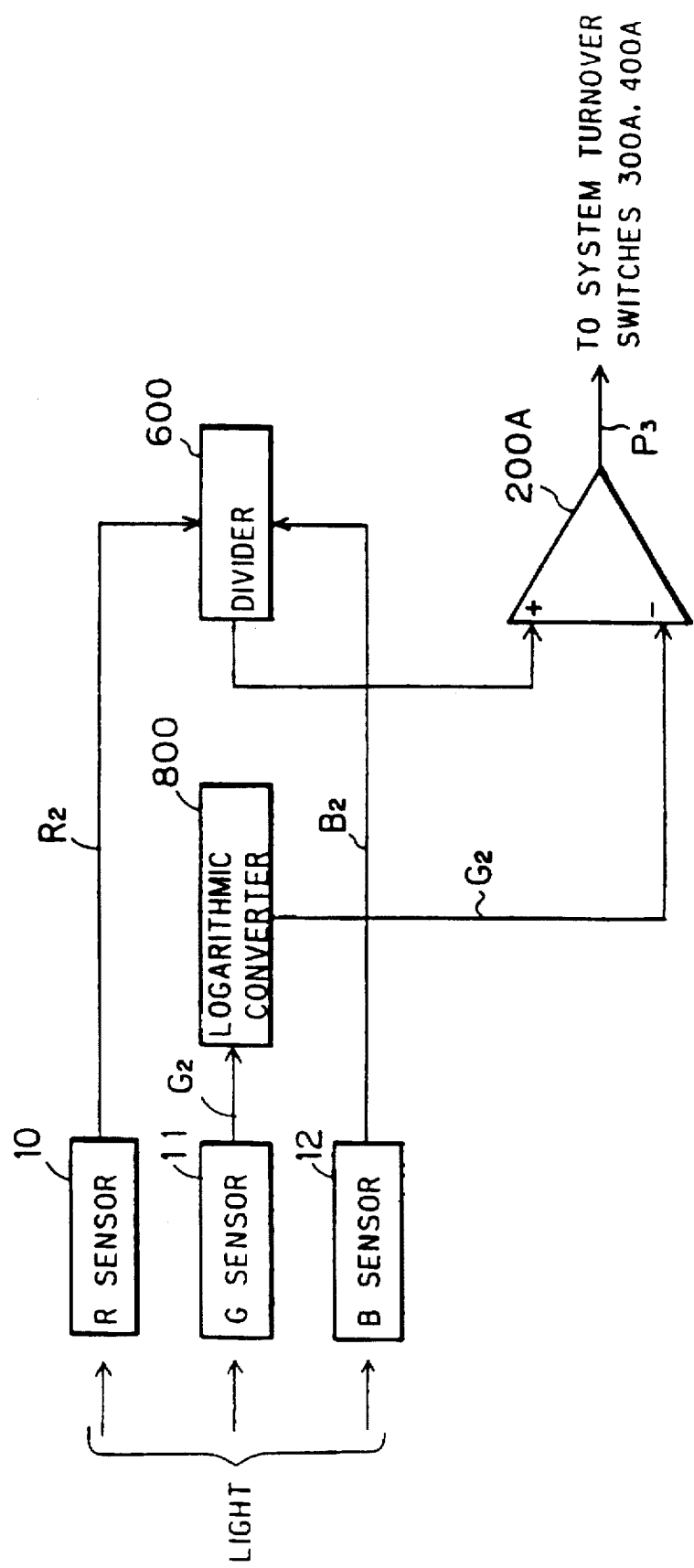

AUTOMATIC WHITE BALANCE REGULATING DEVICE HAVING INTERCHANGEABLE SYSTEMS

This is a Division of application Ser. No. 08/433,951 filed on May 4, 1995, now U.S. Pat. No. 5,528,373 which is a continuation of application Ser. No. 08/176,015 filed on Dec. 30, 1993 (now abandoned), which is a division of application Ser. No. 07/954,044 (U.S. Pat. No. 5,298,980) filed on Sep. 30, 1992, which is a division of application Ser. No. 07/644,559 (U.S. Pat. No. 5,185,658) filed on Jan. 23, 1991.

BACKGROUND OF THE INVENTION

1. Field of the Invention

The present invention relates to an automatic white balance regulating device employed in a color video camera and a color electronic camera.

2. Description of the Prior Art

FIG. 1 is a block diagram showing an architecture of a conventional automatic white balance regulating device provided with a color temperature sensor system, which is employed in a color video camera. Light 2 reflected by an object passes through a lens 100 to an image pickup element 1. The pickup element 1 converts the light 2 from the object into a video signal E and applies it to a luminance signal processing circuit 3 and a chroma signal processing circuit 4. The luminance signal processing circuit 3 produces a luminance signal F from the video signal E and applies it to an adder 5. The chroma signal processing circuit 4 divides the video signal E received from the pickup element 1 into a blue signal $B_1$, a red signal $R_1$ and a green signal $G_1$. The green signal $G_1$ is applied to an input (−) of each of subtractors 6, 7, and the red signal $R_1$ and the blue signal $B_1$ are applied to a red signal gain control circuit (referred to as "R gain control circuit" hereinafter) 8 and a blue signal gain control circuit (referred to as "B gain control signal" hereinafter) 9, respectively.

Meanwhile, a red sensor (referred to as "R sensor" hereinafter) 10 outputs a red signal $R_2$ corresponding to red color component in the incident light, a green sensor (referred to as "G sensor" hereinafter) 11 outputs a green signal $G_2$ corresponding to a green color component in the incident light, and a blue sensor (referred to as "B sensor" hereinafter) 12 outputs a blue signal $B_2$ corresponding to a blue color component in the incident light, respectively. A divider 13a logarithmically converts the red signal $R_2$ and the green signal $G_2$ and subtracts one from the other to output a white balance control signal $H_{1a}$ representing the ratio of these signals, and a divider 14a logarithmically converts the blue signal $B_2$ and the green signal $G_2$ and subtracts one from the other to output a white balance control signal $H_{2a}$ representing the ratio of these signals.

The R gain control circuit 8 receives the white balance control signal $H_{1a}$ and changes its gain in an amount corresponding to the white balance control signal $H_{1a}$. The B gain control circuit 9 receives the white balance control signal $H_{2a}$ and changes its gain in an amount corresponding to the white balance control signal $H_{2a}$. For example, as the level of the red signal $R_1$ gets higher, the gain of the R gain control circuit 8 becomes smaller, while as the level of the red signal $R_1$ gets lower, the gain of the R gain control circuit 8 becomes larger. The variation in the gain keeps the ratio of the red, green and blue signals, $R_1$, $G_1$ and $B_1$ constant. In this way, the regulation of white balance is performed.

The R gain control circuit 8 amplifies the red signal $R_1$ and applies the resultant signal to an input (+) of the subtractor 6. The B gain control circuit 9 amplifies the blue signal $B_1$ and applies the resultant signal to an input (+) of the subtractor 7. The subtractor 6 subtracts the green signal $G_1$ from the amplified red signal $R_1$ and applies the resultant color difference signal $I_1$ to a modulator 15. The subtractor 7 subtracts the green signal $G_1$ from the amplified blue signal $B_1$ and applies the resultant color difference signal $I_2$ to the modulator 15. The modulator 15 performs vertical two-phase modulation using the color difference signals $I_1$, $I_2$ and applies the resultant modulation signal J to the adder 5. A synchronization signal generator 16 generates a vertical synchronization signal K and applies it to the adder 5. The adder 5 adds the luminance signal F, the modulation signal J and the vertical synchronization signal K and outputs an NTSC output L.

FIG. 2 is a block diagram showing an architecture of a conventional automatic white balance regulating device provided with a pickup color signal processing system, which is employed in a color video camera. The automatic white balance regulating device shown in FIG. 2 is different from the device shown in FIG. 1 in that the output from the chroma signal processing circuit 4 is used to obtain the white balance control signals $H_{1b}$, $H_{2b}$. The green signal $G_1$ and the red signal $R_1$ outputted from the chroma signal processing circuit 4 are applied to a divider 13b, and the green signal $G_1$ and the blue signal $B_1$ outputted from the same are applied to a divider 14b, respectively. The divider 13b logarithmically converts the red signal $R_1$ and the green signal $G_1$ and subtracts one from the other to output a white balance control signal $H_{1b}$ representing the ratio of these signals, while the divider 14b logarithmically converts the blue signal $B_1$ and the green signal $G_1$ and subtracts one from the other to output a white balance control signal $H_{2b}$ representing the ratio of these signals. Other components are the same as those of the device shown in FIG. 1.

The R gain control circuit 8 changes its gain in response to the white balance control signal $H_{1b}$, while the B gain control circuit 9 changes its gain in response to the white balance control signal $H_{2b}$. By thus altering the gain of each of the R and B gain control circuits 8 and 9, the automatic white balance regulation circuit is performed as stated above. Other operations of this device are similar to those of the device shown in FIG. 1.

The conventional automatic white balance regulating device, structured as stated above, has the problems mentioned below.

First, the problems of the color video camera provided with a color temperature sensor system, which is shown in FIG. 1, will be discussed. With this type of color video camera, when a scene of the outdoors is shot indoors through a window during the day, the R sensor 10, the G sensor 11 and the B sensor 12 receive the incident light from a light source set indoors. Thus, the white balance regulation is performed based upon the color temperature of the indoor light source. However, the light inputted to the pickup element 1 is the light 2 reflected by an object which is outdoors. As a result, there is the problem that an error arises in the white balance regulation because of the difference between the color temperature of the outdoor light source (i.e., the sun light) and that of the indoor light source.

Now, the problem of the color video camera provided with the pickup color signal processing system shown in FIG. 2 will be discussed. In the case where a person in a red sweater standing on a green lawn, for example, is shot with this type of color video camera, moving a lens 100 by a motor M to zoom out causes a major part of the shot scene (90% of the scene, for example) to be green. In this case, the red of the sweater hardly appears on the scene. On the other hand, moving the lens 100 by the motor M to zoom in causes a major part of the shot scene to be red. Thus when most of the shot scene lies in a single color, the white balance control signals $H_{1b}$, $H_{2b}$ excessively alter in level, and the white balance regulation is inappropriately performed. Essentially, the lawn and the person in the red sweater are irradiated with sun light, and the white balance regulation is performed based upon the color components of the sun light. As a result, there is the problem that an error arises in the white balance regulation, and the green lawn is shot in blueish green and the red sweater is shot in brownish red.

The problem which is caused in the case where a scene at sunset is shot with a color video camera provided with either the color temperature sensor system or the pickup color signal processing system will be discussed. At sunset the red signals $R_1$, $R_2$ considerably increase in level, while the blue signals $B_1$, $B_2$ considerably decrease in level. Because of this, the white balance regulation is so performed that the gain of the R gain control circuit 8 gets small and the gain of the B gain control circuit 9 gets large. Regulating in this way, the scene at sunset is shot by the video camera with a red component being restrained. Thus, there is the problem that the scene shot by the video camera, though shot at sunset, has no difference from ordinary scenes shot during the day.

SUMMARY OF THE INVENTION

In the first aspect of the present invention, an automatic white balance regulating device built in an image pickup device for shooting an object and provided with a color temperature sensor system and a camera color signal processing system comprises a plurality of color sensors for receiving the light around the place where the image pickup device is set in position in order to output a plurality of first color component signals, image pickup means for shooting the object to output a plurality of second color component signals, first control signal producing means for producing a first white balance control signal of the color temperature sensor system, using the first color component signals, second control signal producing means for producing a second white balance control signal of the camera color signal processing system, using the second color component signals, system selecting means for selecting the first white balance control signal when it is brighter around the place where the image pickup device is set in position than it is around the object, and selecting the second white balance control signal when it is not, and level regulating means for regulating a level of one of the first and second color signals in response to the white balance control signal is selected by the system selecting means.

In the second aspect of the present invention, an automatic white balance regulating device built in an image pickup device for shooting an object and provided with a color temperature sensor system and a camera color signal processing system comprises a plurality of color sensors for receiving the light around the place where the image pickup device is set in position to output a plurality of first color component signals, image pickup means for shooting the object to output a plurality of second color component signals, first control signal producing means for producing a first white balance control signal of the color temperature sensor system, using the first color component signals, second control signal producing means for producing a second white balance control signal of the camera color signal processing system, using the second color component signals, system selecting means for selecting the first white balance control signal when the brightness around the place where the image pickup device is set in position is at a predetermined level or over, and selecting the second white balance control signal when it is not, and level regulating means for regulating a level of one of the first and second color component signals in response to which white balance control signal is selected by the system selecting means.

In the third aspect of the present invention, an automatic white balance regulating device built in an image pickup device for shooting an object and provided with a color temperature sensor system and a camera color signal processing system comprises a plurality of color sensors for receiving the light around the place where the image pickup device is set in position to output a plurality of first color component signals, image pickup means for shooting the object to output a plurality of second color component signals, first control signal producing means for producing a first white balance control signal of the color temperature sensor system, using the first color component signals, second control signal producing means for producing a second white balance control signal of the camera color signal processing system, using the second color component signals, system selecting means for selecting the first white balance control signal when zooming in or out is performed in a predetermined amount, and selecting the second white balance control signal when it is not, and level regulating means for regulating a level of which one of first and second color component signals in response to the first or second white balance control signal selected by the system selecting means.

In the fourth aspect of the present invention, an automatic white balance regulating device built in an image pickup device for shooting an object and provided with a color temperature sensor system and a manual operating system comprises a plurality of color sensors for receiving the light around the place where the image pickup device is set in position to output a plurality of first color component signals, image pickup means for shooting the object to output a plurality of second color component signals, first control signal producing means for producing a first white balance control signal of the color temperature sensor system, using the first color component signals, second control signal producing means for producing a second white balance control signal which can be manually adjusted, system selecting means for selecting the second white balance control signal when a level of one of the color component component in a light source is very high, and selecting the first white balance control signal when it is not, and level regulating means for regulating a level of one of the first and second color component signals in response to which white balance control signal is selected by the system selecting means.

In the fifth aspect of the present invention, an automatic white balance regulating device built in an image pickup device for shooting an object and provided with a camera color signal processing system and a manual operating system comprises image pickup means for shooting the object to output a plurality of first color component signals, first control signal producing means for producing a first white balance control signal of the color component temperature sensor system, using the first color signals, second control signal producing means for producing a second white balance control signal which can he manually regulated, system selecting means for selecting the second white balance control signal when a level of a predetermined color component in a light source is very high, and selecting the first white balance control signal when it is not, and level regulating means for regulating a level of predetermined one of the second color signals in response to the first or second white balance control signal selected by the system selecting means.

In the sixth aspect of the present invention, an automatic white balance regulating device built in an image pickup device for shooting an object and provided with a color temperature sensor system and a camera color signal processing system comprises a plurality of color sensors for receiving the light around the place where the image pickup device is set in position to output a plurality of first color component signals, image pickup means for shooting the object to output a plurality of second color component signals, first control signal producing means for producing a first white balance control signal of the color temperature sensor system, using the first color component signals, second control signal producing means for producing a second white balance control signal of the camera color signal processing system, using the second color component signals, brightness detecting means for detecting whether it is brighter around the place where the image pickup device is set in position or around the object in order to output a first control signal in accordance with the detection result, zoom amount detecting means for detecting an amount of zoom in/out of the camera in order to output a second control signal in accordance with the amount of zoom, system selecting means for receiving the first and second white balance control signals and first and second control signals to selectively output one of the first and second white balance control signals on the basis of the value of the first and second control signals, and level regulating means for regulating a level of one of the first and second color component signals in response to which white balance control signal is selected by the system selecting means.

In the seventh aspect of the present invention, an automatic white balance regulating device built in an image pickup device for shooting an object and provided with a color temperature sensor system, a camera color signal processing system and a manual operating system comprises a plurality of color component sensors for receiving the light around the place where the image pickup device is set in position to output a plurality of first color signals, image pickup means for shooting the object to output a plurality of second color component signals, first control signal producing means for producing a first white balance control signal of the color temperature sensor system, using the first color signals, second control signal producing means for producing a second white balance control signal of the camera color signal processing system, using the second color component signals, first system selecting means for selecting the first white balance control signal when it is brighter around the place where the image pickup device is set in position than it is around the object, and selecting the second white balance control signal when it is not, third control signal producing means for producing a third white balance control signal which can be manually adjusted, second system selecting means connected to an output side of the first system selecting means for selecting the third white balance control signal when a level of a predetermined color component in a light source is very high, and selecting the first or second white balance control signal from the first system selecting means when it is not, and level regulating means for regulating a level of one of the first and second color component signals in response to which of the first, second and third white balance control signal is selected by the second system selecting means.

In the eighth aspect of the present invention, an automatic white balance regulating device built in an image pickup device for shooting an object and provided with color temperature sensor system, a camera color signal processing system and a manual operating system comprises plurality of color sensors for receiving the light around the place where the image pickup device is set in position to output a plurality of first color component signals, image pickup means for shooting the object to output a plurality of second color component signals, first control signal producing means for producing a first white balance control signal of the color temperature sensor system, using the first color signals, second control signal producing means for producing a second white balance control signal of the camera color signal processing system, using the second color component signals, first system selecting means for selecting the first white balance control signal when zooming in or out is performed by a predetermined amount, and selecting the second white balance control signal when it is not, third control signal producing means for producing a third white balance control signal which can be manually regulated, second system selecting means connected with an output side of the first system selecting means for selecting the third white balance control signal when a level of a predetermined color component in a light source is very high, and using the first selective means to select the first or second white balance control signal from the first when it is not, and level regulating means for regulating a level of predetermined one of the second color signals in response to the first, second or third white balance control signal selecteed by the second system selecting means.

In the ninth aspect of the present invention, an automatic white balance regulating device built in an image pickup device for shooting an object and provided with a color temperature sensor system, a camera color signal processing system and a manual operating system comprises a plurality of color sensors for receiving the light around the place where the image pickup device is set in position to output a plurality of first color component signals, image pickup means for shooting the object to output a plurality of second color component signals, first control signal producing means for producing a first white balance control signal of the color temperature sensor system, using the first color signals, second control signal producing means for producing a second white balance control signal of the camera color signal processing system, using the second color component signals, brightness detecting means for detecting whether it is brighter around the place where the image pickup device is set in position or around the object to output a first control signal in accordance with a detection result, zoom amount detecting means for detecting an amount of zoom in/out to output a second control signal in accordance with the amount, first system selecting means for receiving the first and second white balance control signals and first and second control signals to selectively output one of the first and second white balance control signals in accordance with the values of the first and second control signals, third control signal producing means for producing a third white balance control signal which can be manually regulated, second system selecting means connected to an output side of the first system selecting means for selecting the third white balance control signal when a level of a predetermined color component in a light source is very high, and using the first selecting means to select either the first or second white balance control signal when it is not, and level regulating means for regulating a level of one of the first and second color component signals in response to whether the first, second or third white balance control signal is selected by the second system selecting means.

According to the present invention, the system selecting means which switches the shooting situation is provided to select a white balance control signal appropriate to the shooting situation, whereby the white balance regulation can be appropriately performed depending on the shooting situation.

Accordingly, it is an object of the present invention to provide an automatic white balance regulating device which can perform perfect white balance regulation corresponding to the change in the shooting situation.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B, FIGS. 4A and 4B, FIGS. 5A and 5B, FIGS. 6A and 6B, FIGS. 7A and 7B, FIGS. 8A and 8B, FIGS. 9A and 9B and FIG. 10A are block diagrams showing first to fifteenth embodiments of an automatic white balance regulating device according to the present invention;

FIG. 11A is a block diagram showing a sixteenth to embodiment of the automatic white balance regulating device according to the present invention;

FIGS. 12 to 15, FIGS. 16A and 16B, FIGS. 17A and 17B and FIGS. 18A and 18B are block diagrams showing seventeenth to twenty-third embodiments of the automatic white balance regulating device according to the present invention.

DETAILED DESCRIPTION OF THE PREFERRED EMBODIMENT

FIGS. 3A to 9B are block diagrams showing various embodiments of an automatic white balance regulating device according to the present invention which eliminates the inconvenience arising when a scene of the outdoors is shot indoors through the window in day.

Figure 2:
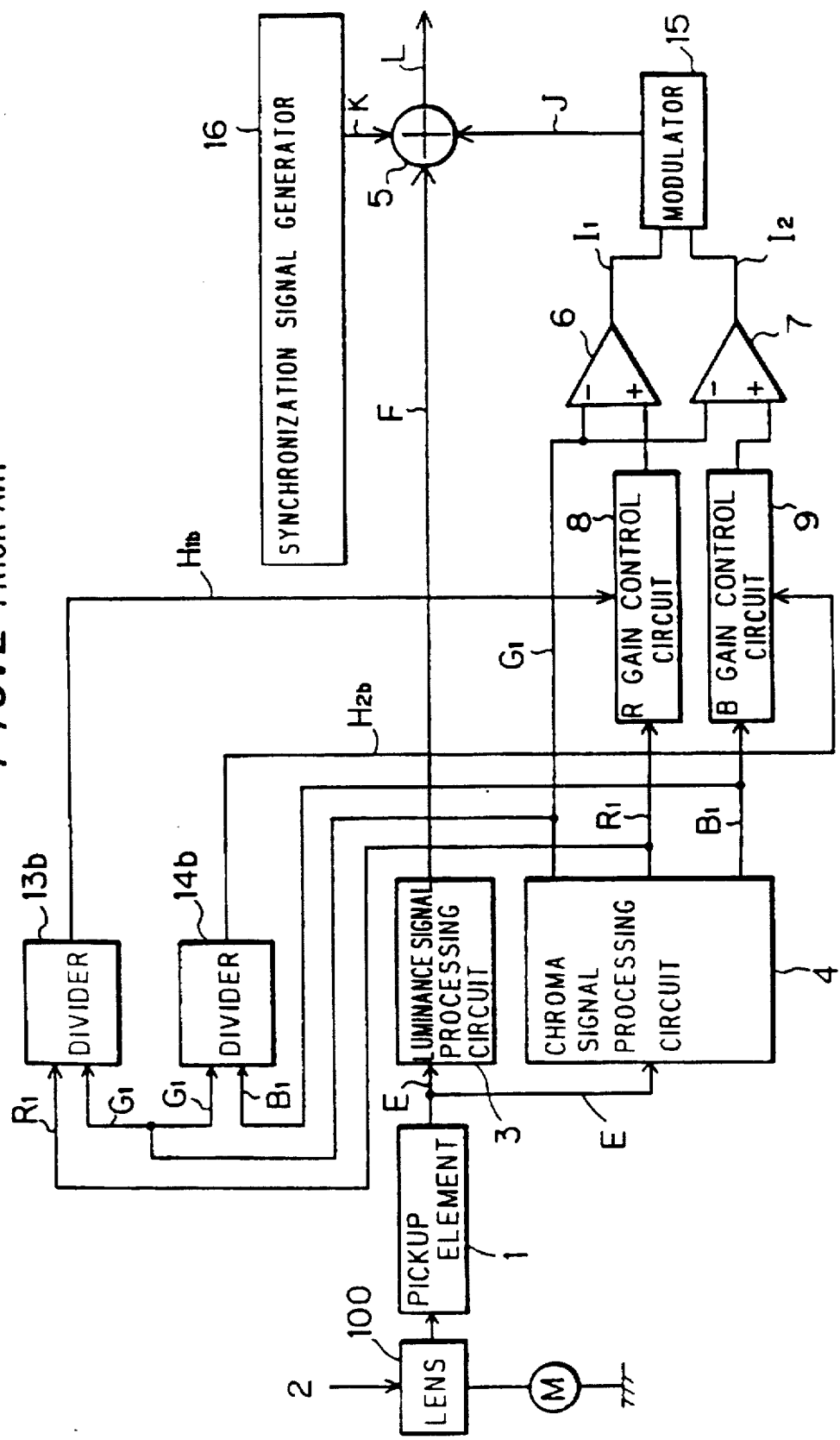
Figure 3A:
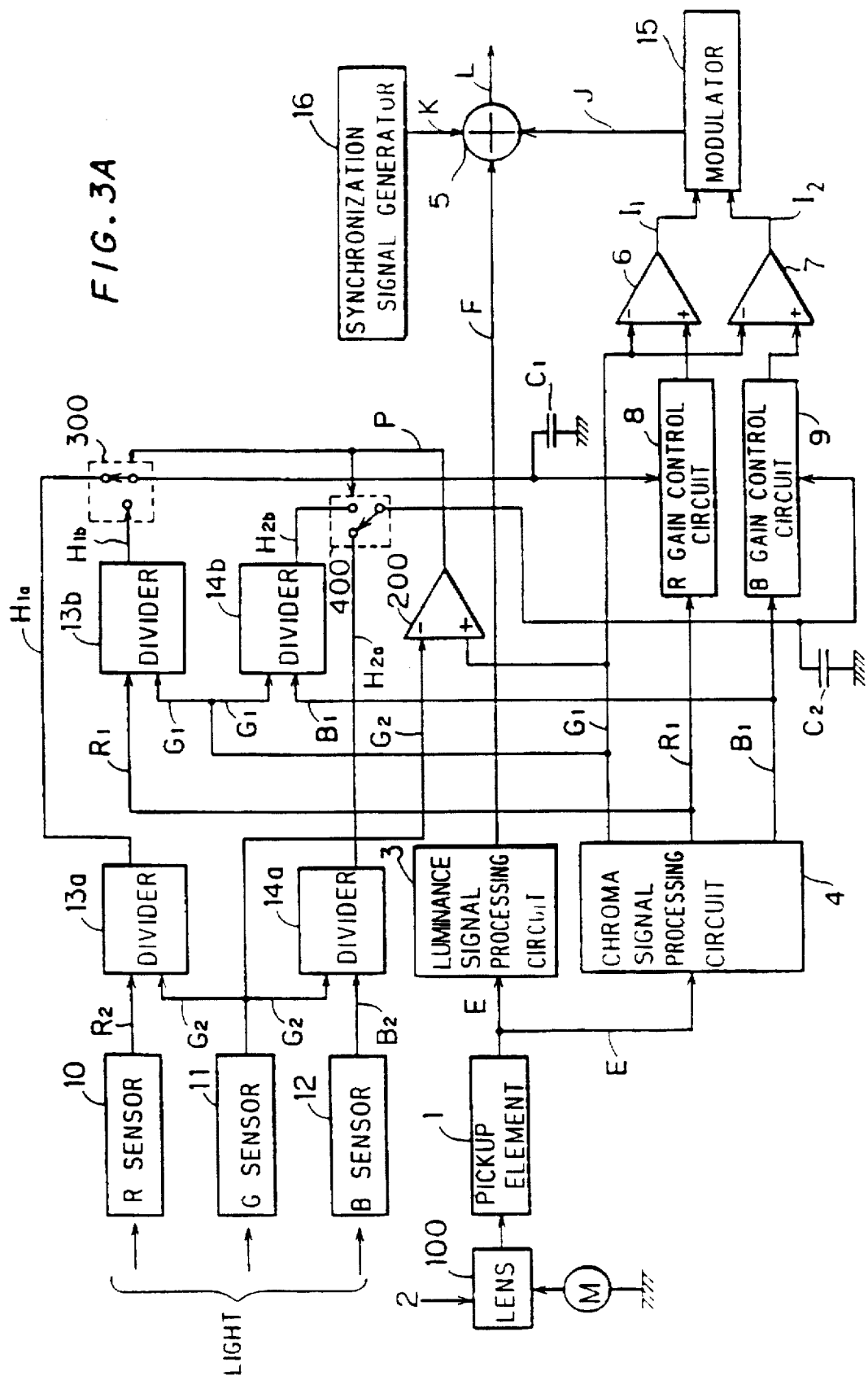

FIG. 3A is a block diagram showing a first embodiment of the automatic white balance regulating device according to the present invention. The automatic white balance regulating device shown in FIG. 3A is different from the conventional devices shown in FIGS. 1 and 2 in that it is a combination of the devices shown in FIGS. 1 and 2 and consequently is capable of switching between the color temperature sensor system and the pickup color signal processing system corresponding to the shooting situation.

Figure 1:
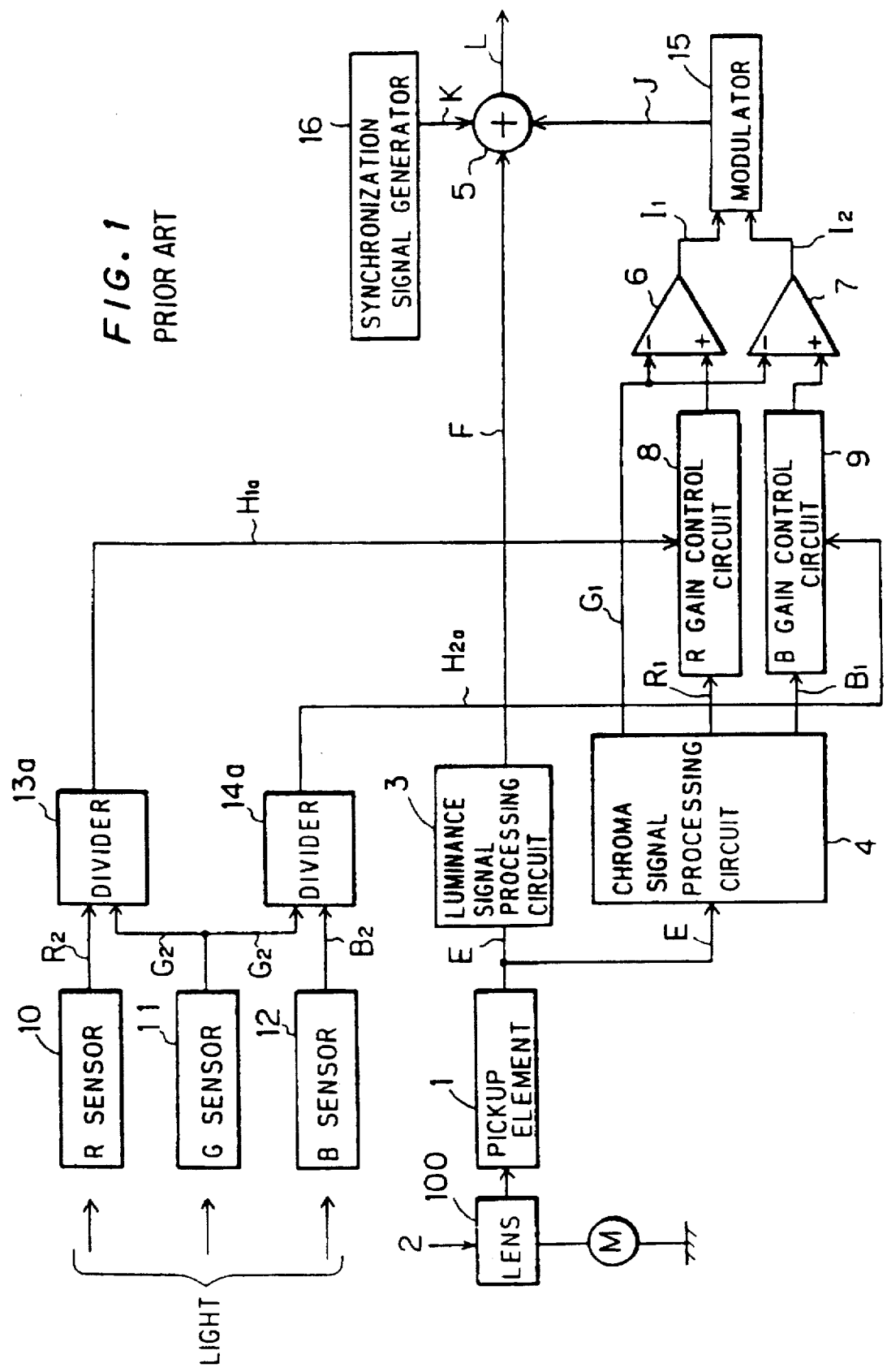
FIGS. 1 and 2 are block diagrams showing a conventional automatic white balance regulating device.

Specifically, the devices shown in FIGS. 1 and 2 are combined having common circuits and common elements, and a comparator 200 and system changeover switches 300, 400 are additionally provided. In the first embodiment, the brightness around an object is represented by the green signal $G_1$, while the brightness around the place where the video camera is set in position is represented by the green signal $G_2$. The comparator 200 receives the green signals $G_1$, $G_2$, and it outputs a system changeover signal P corresponding to the result of the comparison of the green signal $G_1$ with the green signal $G_2$. The system changeover switch 300 is placed on a path including the dividers 13a, 13b and the R gain control circuit 8, and the system changeover switch 400 is placed on a path including the dividers 13a, 13b and the B gain control circuit 9. The system changeover switches 300, 400 change The connections in response to the system changeover signal P. Functions of other circuits and elements and connections thereof are similar to those shown in FIGS. 1 and 2.

Shooting a scene of the outdoors from indoors during the day with a video camera provided with the aforementioned automatic white balance regulating device will be described. In such a shooting situation, it is brighter outdoors. Naturally, the level of the green signal $G_1$ outputted from the chroma signal processing circuit 4 is higher than the level of the green signal $G_2$ outputted from the G sensor 11 receiving the light from a light source set indoors. Thus, the system changeover signal P outputted from the comparator 200 turns "high" level in level. In response to the "high", the system changeover switches 300, 400 switch to connect with the dividers 13b, 14b (to choose the pickup color signal processing system), respectively, and the R gain control circuit 8 and the B gain control circuit 9 receive the white balance control signals $H_{1b}$, $H_{2b}$, respectively. The R gain control circuit 8 and the B gain control circuit 9 alter in gain in response to the the white balance control signals $H_{1b}$, $H_{2b}$ to perform the white balance regulation in the aforementioned manner. In this case, since the white balance regulation is performed based upon the light 2 reflected by the object, an error does not arise in the white balance regulation as in the conventional cases. As a result, the object, when televised, can be seen in natural colors on a television screen.

Now, shooting a night scene of the outdoors from indoors will be described. In such a shooting situation, it is brighter indoors. Naturally, the level of the green signal $G_2$ receiving the light from the light source set indoors is higher than the level of the green signal $G_1$ outputted from the chroma signal processing circuit 4. Thus, the system changeover signal P outputted from the comparator 200 turns to "low" in level. In response to the "low" level, the system changeover switches 300, 400 switch to connect with the dividers 13a, 14a (to choose the color temperature sensor system), respectively, and the R gain control circuit 8 and the B gain control circuit 9 receive the white balance control signals $H_{1a}$, $H_{2a}$, respectively. The R gain control circuit 8 and the B gain control circuit 9 alter in gain in response to the white balance control signals $H_{1a}$, $H_{2a}$ to perform the white balance regulation in the aforementioned manner. In this case, the white balance regulation is not performed based upon the light 2 reflected by the object but on the light from the light source in the room. Thus, an error arises in the white balance regulation, but since the illuminance of the object is low, the error in the white balance regulation, when reproduced, is hardly recognizable on the television screen and no inconvenience arises.

Next, shooting the television screen indoors and shooting an object spotlighted will be explained. In this case, the brightness of the object is usually larger than that of the place around the video camera set in position. Thus, the level of the green signal $G_1$ outputted from the chroma signal processing circuit 4 is larger than the level of the green signal $G_2$ outputted from the G sensor 11. Naturally, the system changeover signal P outputted from the comparator 200 turns to "high" in level. In response to the "high" level, the system changeover switches 300, 400 switch to connect the dividers 13b, 14b, respectively, and the R gain control circuit 8 and the B gain control circuit 9 receives the white balance control signals $H_{1b}$, $H_{2b}$, respectively. Thus, the white balance regulation is performed in the aforementioned manner. In this case also, the white balance regulation is performed based upon the illumination of the object, and hence no error arises in the white balance regulation. As a result, the object, when shot and televised, can be seen in natural colors on the television screen.

Connecting capacitors $C_1$, $C_2$ to a path between the R gain control circuit 8 and the system changeover switch 300 and to a path between the B gain control circuit 9 and the system changeover switch 400, respectively, as shown in FIG. 3A, can prevent a pickup screen from suddenly changing in colors when the system changeover switches 300, 400 change the connections. The comparator 200 having a hysteresis characteristic can prevent jitter.

In the first embodiment, the brightness around the object and the brightness around the place of the video camera set in position are represented by the green signals $G_1$, $G_2$, respectively, but they may be represented by the red signals $R_1$, $R_2$ or the blue signals $B_1$, $B_2$, respectively.

Figure 3B:
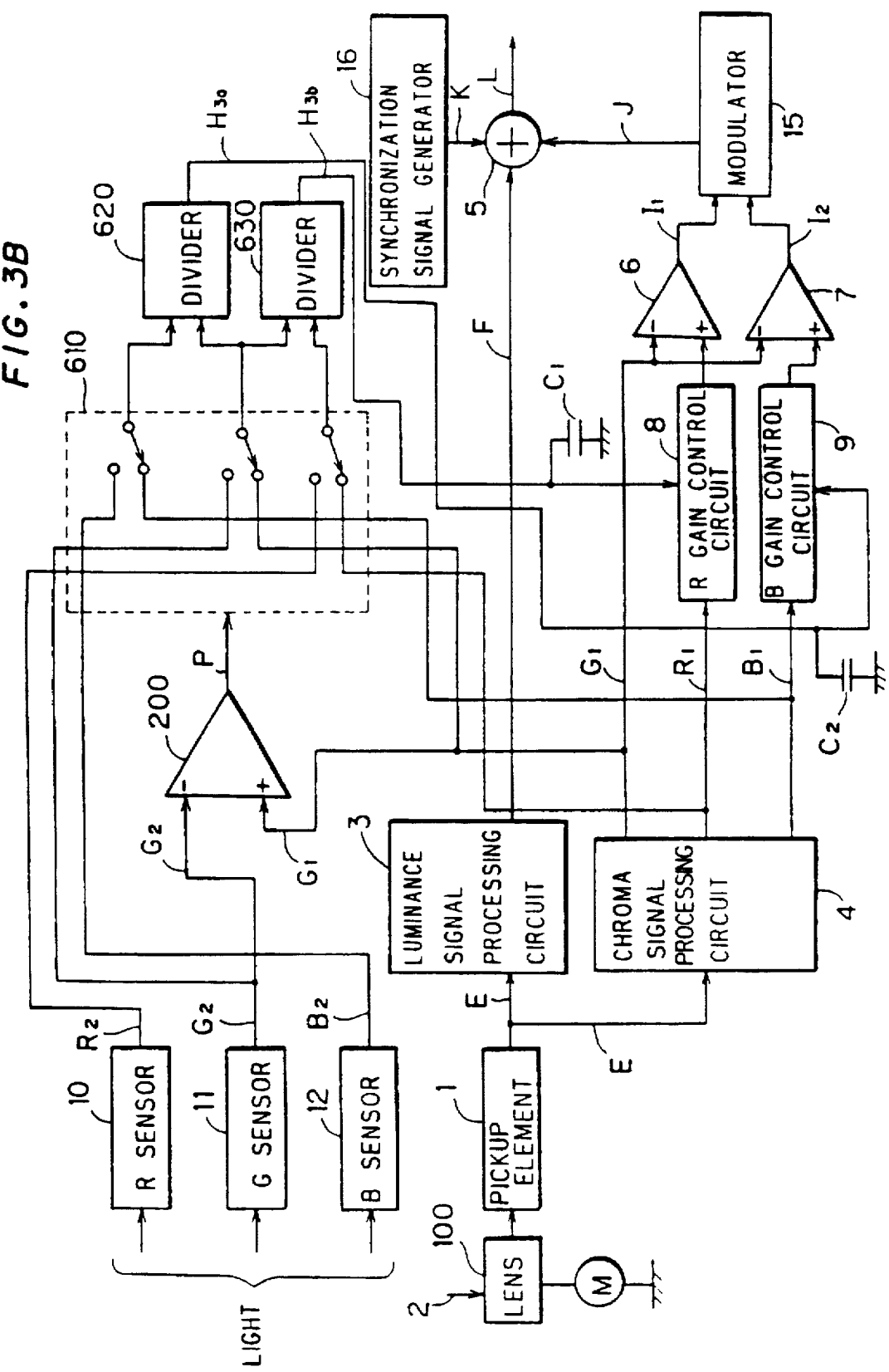

FIG. 3B is a block diagram showing a second embodiment of the automatic white balance regulating device according to the present invention. In the device shown in FIG. 3A, outputs from the comparator 200 are used to switch the outputs to be employed between the outputs of the dividers 13a, 13b and between the outputs of the dividers 14a, 14b; in this embodiment, however, the output from the comparator 200 is used to switch the signals to be applied to dividers 620, 630 between the signals of the color temperature sensor system and of the pickup color signal system.

During daytime, it is brighter outdoors when shooting a scene of the outdoors from indoors. Naturally, the level of the green signal $G_1$ is higher than the level of the green signal $G_2$, and the system changeover signal P outputted by the comparator 200 turns "high" in level. In response to the "high" level, a system changeover switch 610 is connected to the chroma signal processing circuit 4 (to choose the pickup color signal processing system) as shown in FIG. 3B. The green signal $G_1$ and the blue signal $B_1$ are inputted to the divider 620, while the green signal $G_1$ and the red signal $R_1$ are inputted to the divider 630. The dividers 620, 630 output white balance control signals $H_{3a}$, $H_{3b}$ representing the ratios of the inputted signals respectively. The R gain control circuit 8 alters in gain in response to the white balance control signal $H_{3b}$ and the B gain control circuit 9 alters in gain in response to the white balance control signal $H_{3a}$, respectively, to perform the aforementioned white balance regulation. In this case, the white balance regulation is performed based upon the light 2 reflected by the object, and hence the same effects as in the first embodiment can be obtained.

At night, it is brighter indoors in shooting a scene of the outdoors from indoors. Naturally, the level of the green signal $G_2$ is higher than the level of the green signal $G_1$, and the system changeover signal P outputted by the comparator 200 turns "low" in level. In response to the "low" level, the system changeover switch 610 is connected to the R sensor 10, the G sensor 11 and the B sensor 12 (to choose the color temperature sensor system). The green signal $G_2$ and the blue signal $B_2$ are inputted to the divider 620, while the green signal $G_2$ and the red signal $R_2$ are inputted to the divider 630. The dividers 620, 630 output the white balance control signals $H_{3a}$, $H_{3b}$ representing the ratios of the inputted signals, respectively, to apply them to the B gain control circuit 9 and the R gain control circuit 8. Then, the gains of the gain control circuits 9, 8 change in response to the white balance control signals $H_{3a}$, $H_{3b}$ to perform the white balance regulation. In this case, the white balance regulation is performed based not upon the light 2 reflected by the object but upon the light from the indoor light source. Thus, an error arises in the white balance regulation, but since the illuminance of the object is low, the error is hardly recognizable on the television screen, and no inconvenience arises.

In shooting a television screen indoors or shooting an object spotlighted indoors, it is usual that the brightness of the object is larger than the brightness around the place where the video camera is set in position. Naturally, the level of the green signal $G_1$ is higher than the level of the green signal $G_2$, and hence the system changeover signal P outputted by the comparator 200 turns "high" in level. In response to the "high" level, the system changeover switch 610 is connected with the chroma signal processing circuit 4 (to choose the pickup color signal processing system), as shown in FIG. 3B, to perform the aforementioned white balance regulation and obtain the similar effects. In the second embodiment, the system changeover switch 610 is placed in the stage before the dividers 620, 630. Thus, the two dividers produce the white balance control signals $H_{3a}$, $H_{3b}$, and the required circuit area is reduced compared with that of the first embodiment shown in FIG. 3A.

Figure 4A:
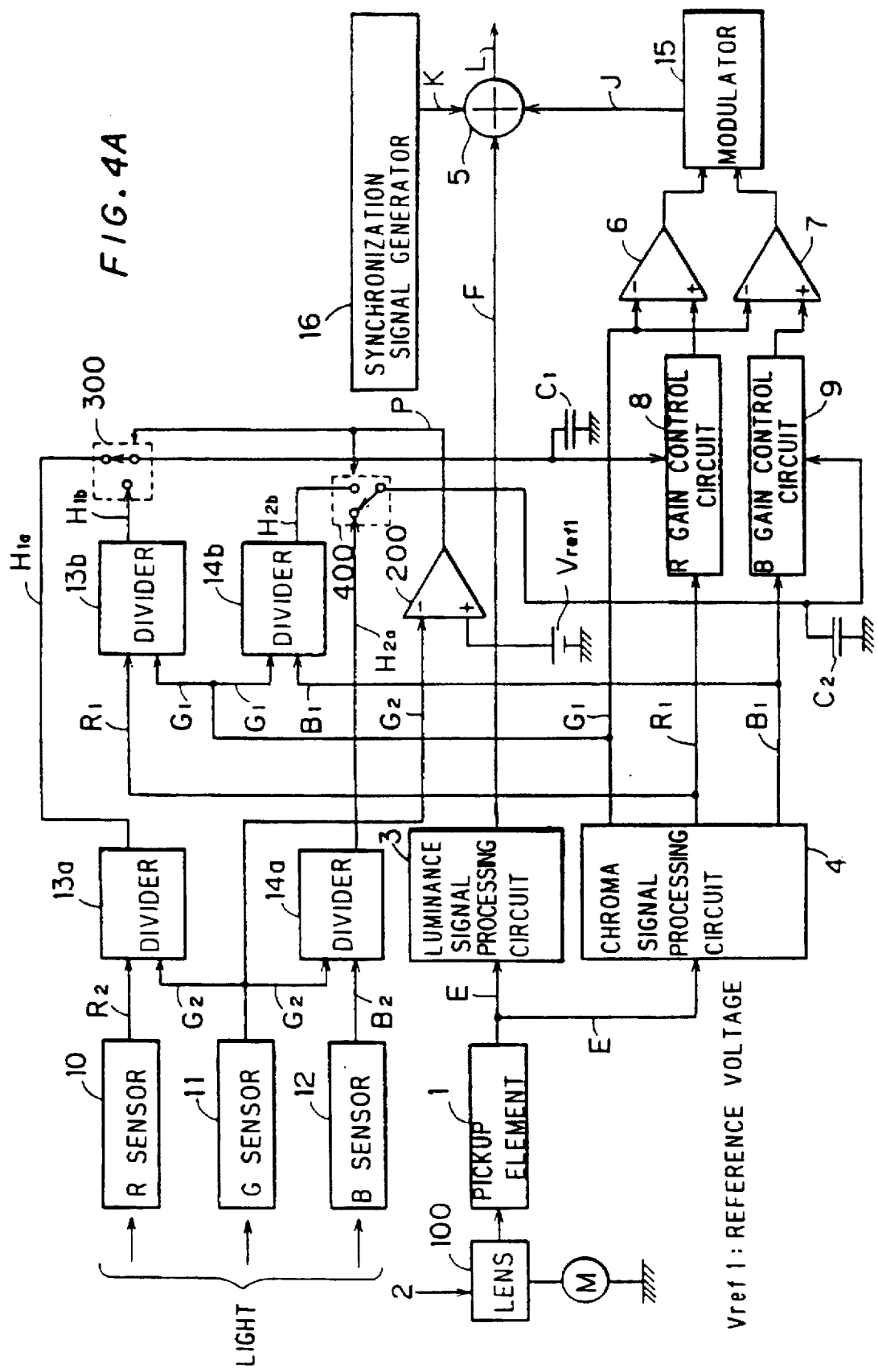

FIG. 4A is a block diagram showing a third embodiment of the automatic white balance regulating device according to the present invention. The device shown in FIG. 4A is different from the device shown in FIG. 3A in that not the green signal $G_1$ but reference voltage $V_{ref1}$ is applied to the input (+) of the comparator 200. In other words, the brightness around the object is represented by the reference voltage $V_{ref1}$. Other components of the device are the same as those of the device shown in FIG. 3A.

Shooting a scene of the outdoors from indoors through the window during the day with a video camera having such a automatic white balance regulating device will be described. The green signal $G_2$ outputted by the G sensor 11 is applied to the input (−) of the comparator 200. In shooting during the day, the reference voltage $V_{ref1}$ is set in advance so that the system changeover signal P outputted by the comparator 200 turns "high" in level. In response to the "high" level, the system changeover switches 300, 400 are connected with the dividers 13b, 14b, and the white balance control signals $H_{1b}$, $H_{2b}$ are applied to the R gain control circuit 8 and the B gain control circuit 9. In this way, the white balance regulation is performed based upon the aforementioned operation, and the same effects as in the embodiment shown in FIG. 3A can be obtained.

Next, shooting a night scene of the outdoors from the room through the window will be discussed. In this case, the system changeover signal P outputted by the comparator 200 turns "low" in level. Then, the white balance regulation is performed in response the white balance control signals $H_{1a}$, $H_{1b}$, as mentioned above, and the same effects as in the embodiment shown in FIG. 3A can be obtained. In shooting the television screen or the object spotlighted, the system changeover signal P turns to "high" in level, and the same operation as in the embodiment of FIG. 3A is performed.

Figure 4B:
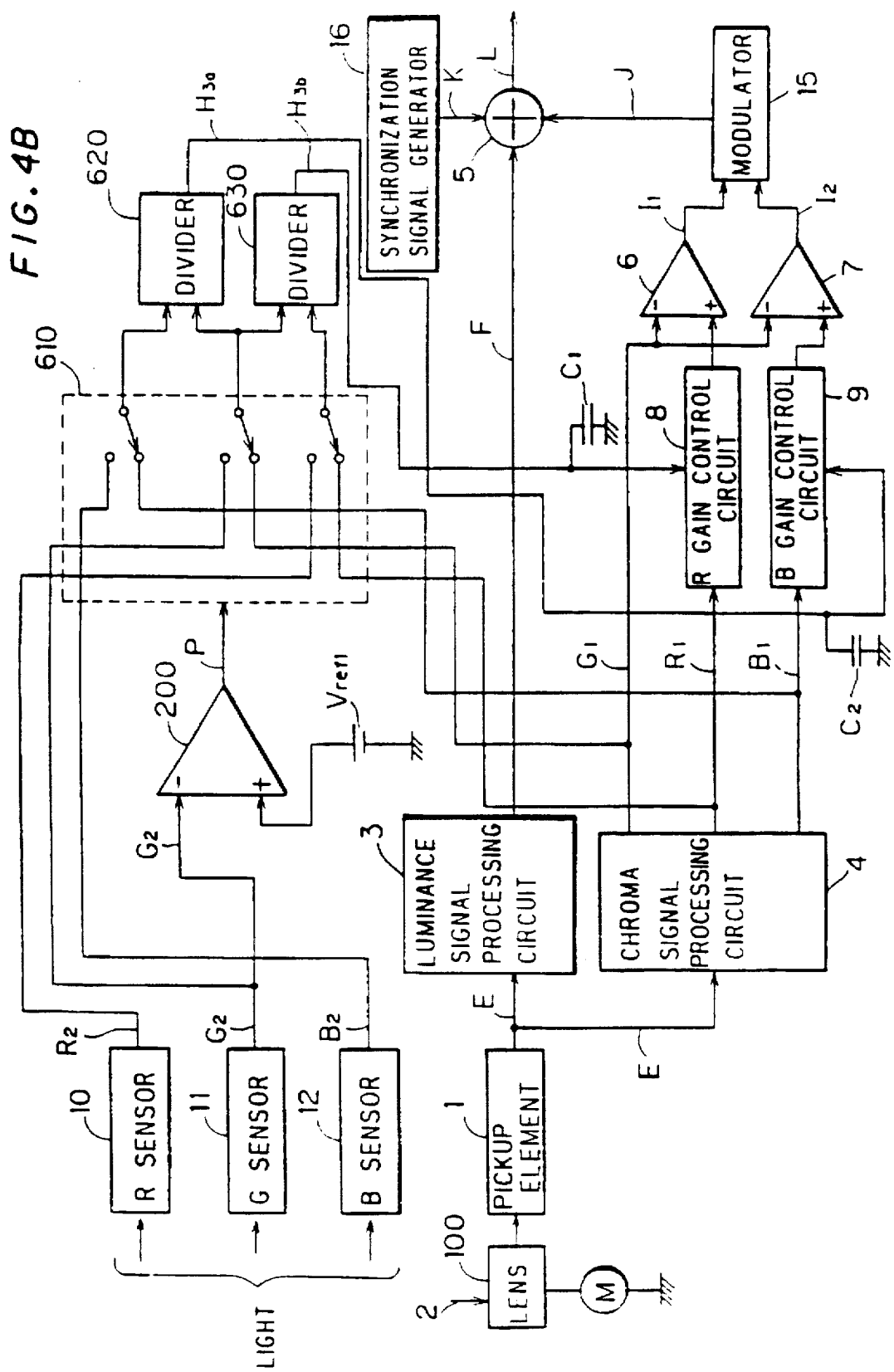

FIG. 4B is a block diagram showing a fourth embodiment of the automatic white balance regulating device according to the present invention. In the device shown in FIG. 4A, outputs of the comparator 200 are used to switch the outputs to be employed between the outputs of the dividers 13a, 13b and between the outputs of the dividers 14a, 14b; in this embodiment, however, outputs of the comparator 200 are used to switch the signals to be applied to the dividers 620, 630 between the signals of the color temperature sensor system and of the pickup color signal system. The effects of the fourth embodiment is the same as in the second embodiment shown in FIG. 3B.

Figure 5A:
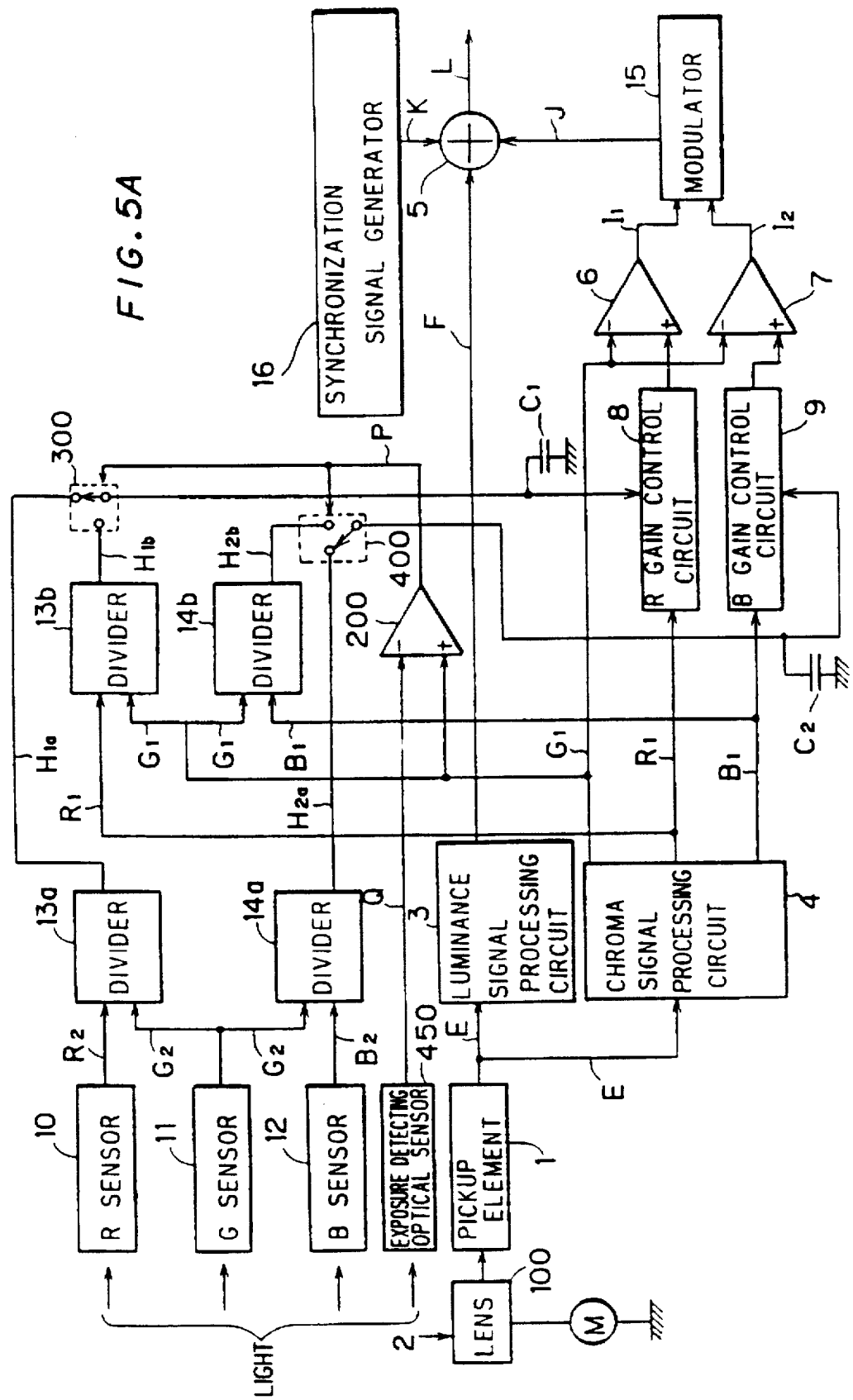
Figure 6A:
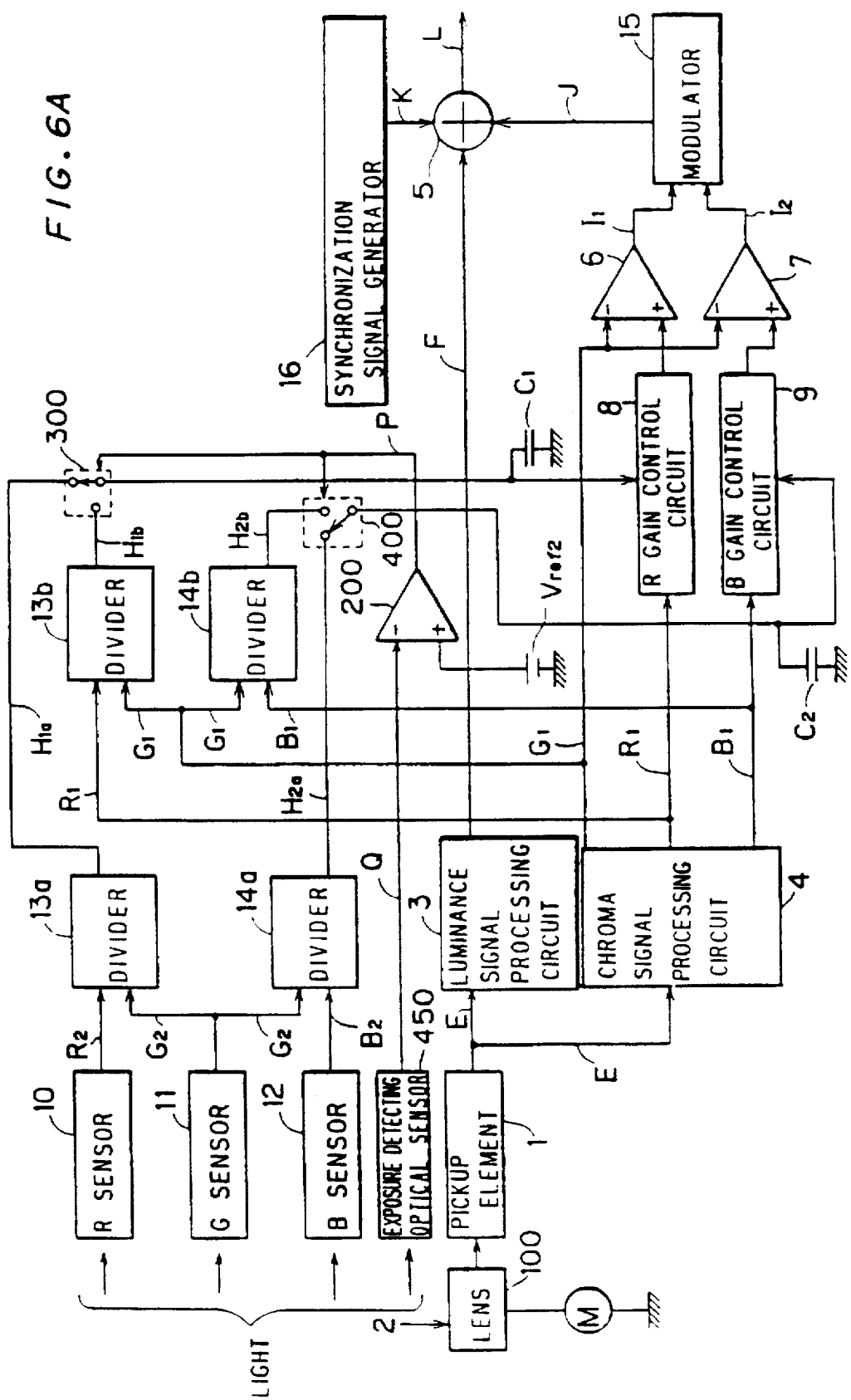

FIGS. 5A and 6A are block diagrams showing fifth and sixth embodiments of the automatic white balance regulating device according to the present invention. The device shown in FIG. 5A is different from the device shown in FIG. 3A and the device shown in FIG. 6A is different from the device shown in FIG. 4A in that an exposure detecting optical sensor 450 is additionally provided so that it applies an exposure signal Q to the input (−) of the comparator 200. In other words, in the embodiments, the brightness around the place where the video camera is set in position is represented by the exposure signal Q. The voltage level of the exposure signal Q is in proportion to the illuminance of the light incident on the exposure detecting optical sensor 450. Other components of the devices are the same as those of the devices shown in FIGS. 3A and 4A.

In the device shown in FIG. 5A, the exposure signal Q and the green signal $G_1$ alter in voltage level corresponding to the shooting situation; the system changeover signal P turns "high" in level when the voltage level of the green signal $G_1$ is lower than that of the exposure signal Q, while the signal P turns "low" in level when the voltage level of the green signal $G_1$ is higher. The system changeover switches 300, 400 change the connections in accordance with the level of the system changeover signal P, as mentioned above, and the white balance regulation is performed in the same way as in the device shown in FIG. 3A.

In the device shown in FIG. 6A, the system changeover signal P turns "high" in level when the exposure signal Q is smaller in voltage level than reference voltage $V_{ref2}$ set in advance similar to the reference voltage $V_{ref1}$ of FIG. 4A, while the signal P turns "low" in level when the exposure signal Q is larger. The system changeover switches 300, 400 change the connections in accordance with the level of the system changeover signal P, as mentioned above, and the white balance regulation is performed in the same way as in the device shown in FIG. 4A. In the embodiments shown in FIGS. 5A and 6A, a color sensor provided with a yellow color filter or a cyanogen color filter may be used instead of the exposure detecting optical sensor 450.

Figure 5B:
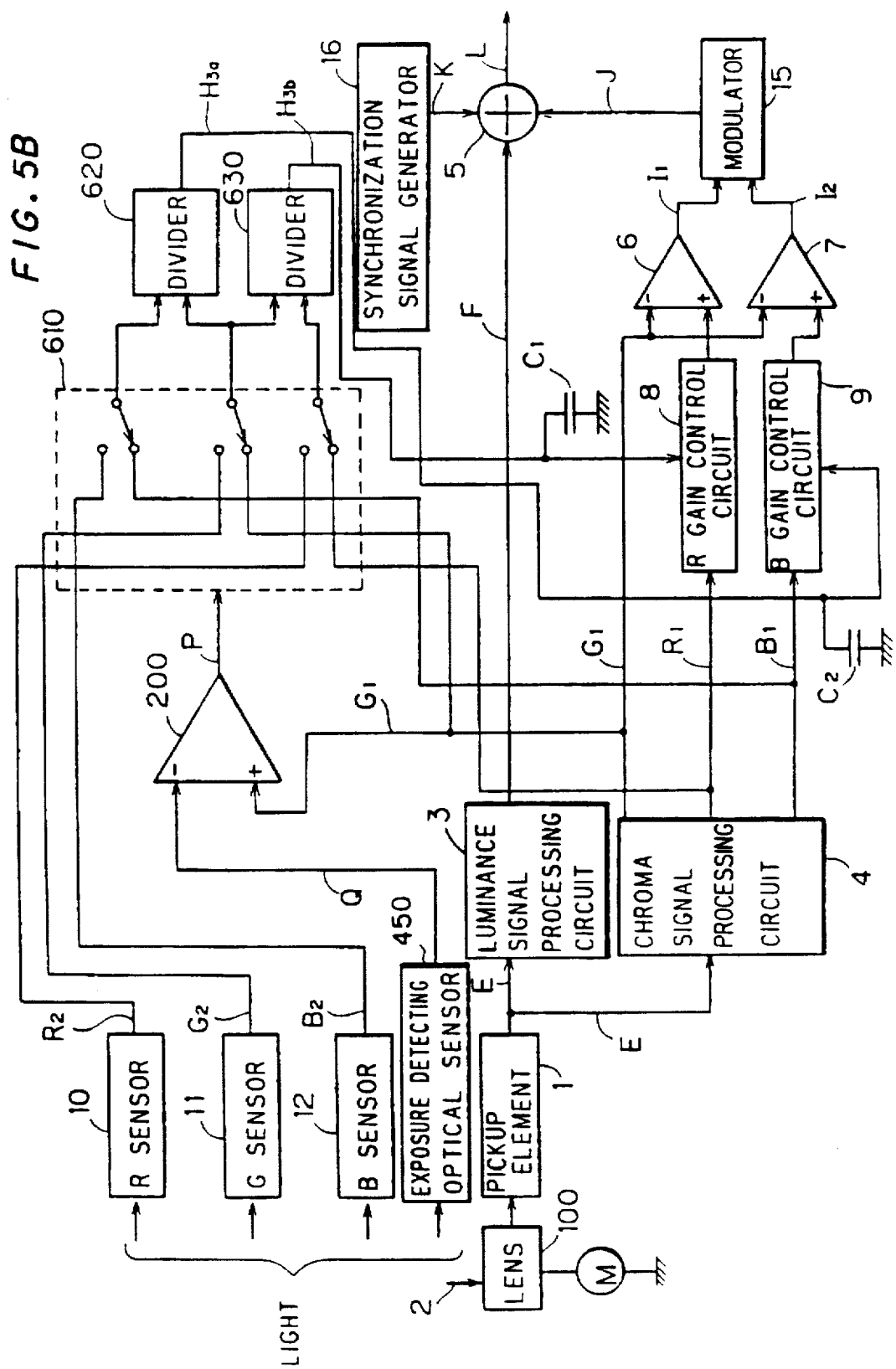

FIGS. 5B and 6B are block diagrams showing seventh and eighth embodiments of the automatic white balance regulating device according to the present invention. In the embodiments, the exposure detecting optical sensor 450 is provided as in the embodiments of FIGS. 5A and 6A. In the embodiments, outputs of the comparator 200 are used to switch the signals to be applied to the dividers 620, 630 in the same way as shown in FIGS. 3B and 4B, and hence the same effects as in the embodiments of FIGS. 3B and 4B can be obtained.

Figure 7A:
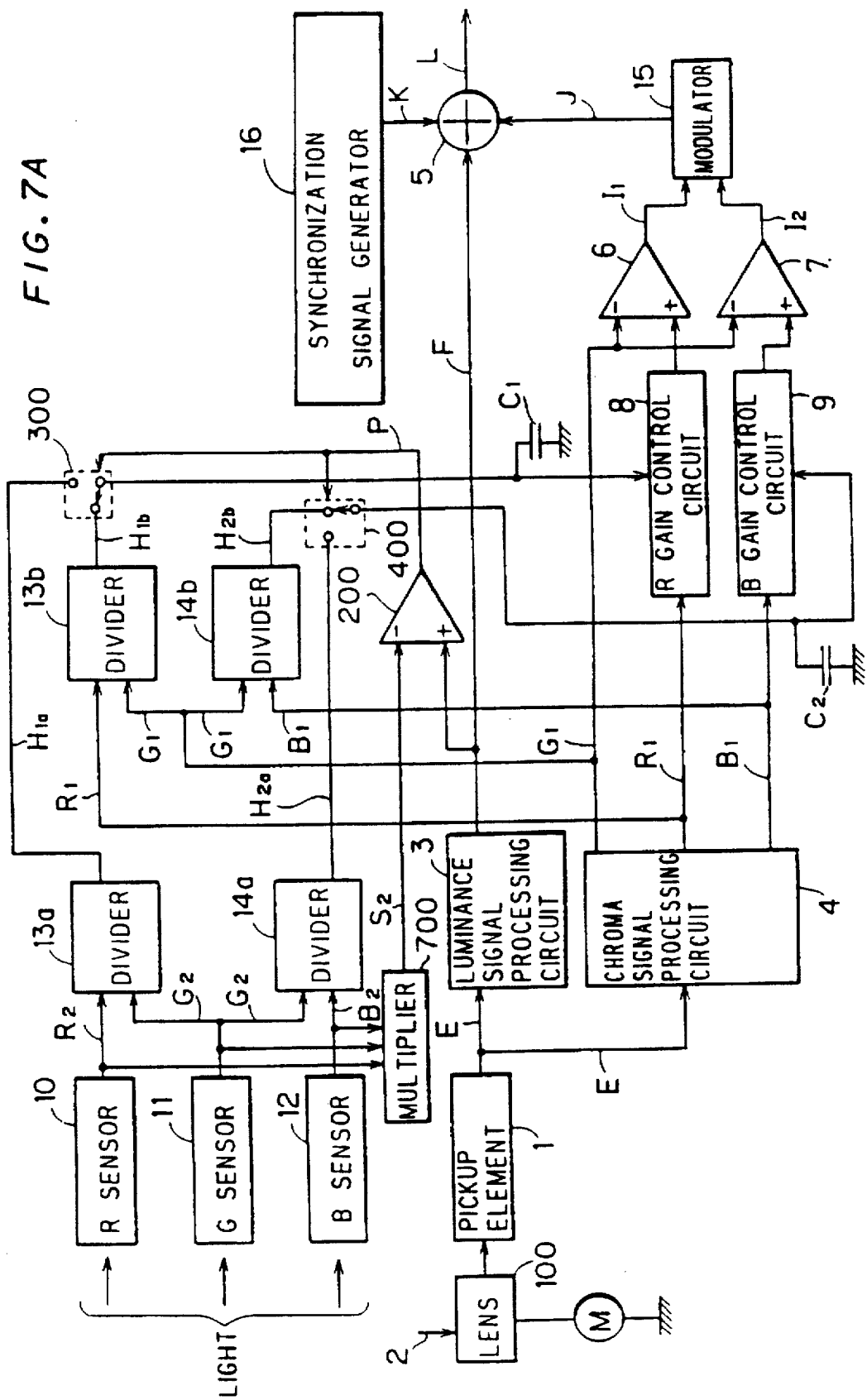

FIG. 7A is a block diagram showing a ninth embodiment of the automatic white balance regulating device according to the present invention. The embodiment shown in FIG. 7A is different from the embodiment shown in FIG. 3A in that a multiplier 700 is additionally provided. The red signal $R_2$, the green signal $G_2$ and the blue signal $B_2$ are inputted to multiplier 700. The multiplier 700 multiplies the signals together to synthesize a signal S and input it to the input (−) of the comparator 200. A luminance signal F which is an output of the luminance signal processing circuit 3 is inputted to the input (+) of the comparator 200. In other words, the brightness around the place where the video camera is set in position is represented by the signal S, and the brightness around the object is represented by the luminance signal F. Other components of the device are the same as those of the device shown in FIG. 3A.

Now, the operation of the above embodiment will be described. In shooting a scene of the outdoors from indoors during the day, it is brighter outdoors, and hence the level of the luminance signal F based upon the light 2 reflected by the object is higher than the level of the signal S which is synthesized by the red signal $R_2$, the green signal $G_2$ and the blue signal $B_2$. This causes the system changeover signal P outputted by the comparator 200 to turn "high" in level. In response to the "high" level, the system changeover switches 300, 400 are connected with the dividers 13b, 14b as shown in FIG. 7A. As a result, the white balance regulation is performed based upon the white balance control signals $H_{1b}$, $H_{2b}$, and the same effects as in the embodiment shown in FIG. 3A can be obtained.

In shooting a night scene of the outdoors from indoors, it is brighter indoors, and hence the level of the signal S is higher than the level of the luminance signal F. This causes the system changeover signal P outputted by the comparator 200 to turn "low" in level. In response to the "low" level, the system changeover switches 300, 400 are connected with the divider 13a, 14a. As a result, the white balance regulation is performed based upon the white balance control signals $H_{1a}$, $H_{2a}$ corresponding to the light from the indoor light source, and an error arises in the white balance regulation. However, since the illuminance of the object is low and the error can not be recognized in the reproduced object on the television screen, there is no problem.

In shooting the television screen or the object spotlighted, the illuminance of the object is larger than the illuminance around the place where the camera is set in position, and hence the system changeover signal P turns "high" in level, and the same operation as in the embodiment shown in FIG. 3A is performed and the same effects can be obtained.

Figure 7B:
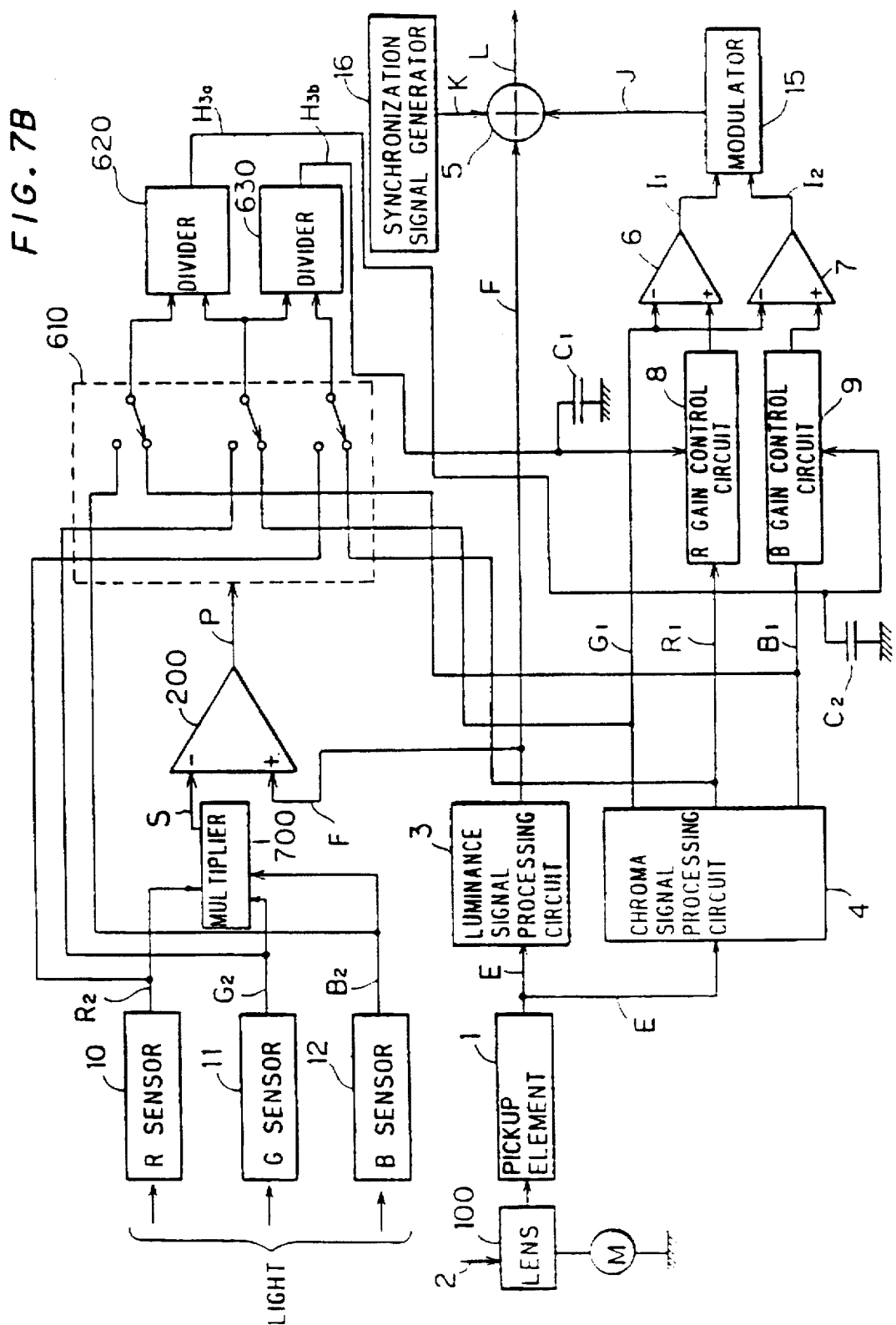

FIG. 7B is a block diagram showing a tenth embodiment of the automatic white balance regulating device according to the present invention. In this embodiment, the multiplier 700 as in the embodiment shown in FIG. 7A is provided. Similar to the embodiment shown in FIG. 3B, outputs of the comparator 200 are used to switch the signals to be applied to the dividers 620, 630, and hence the same effects as in the embodiment shown in FIG. 3B can be obtained.

Figure 8A:
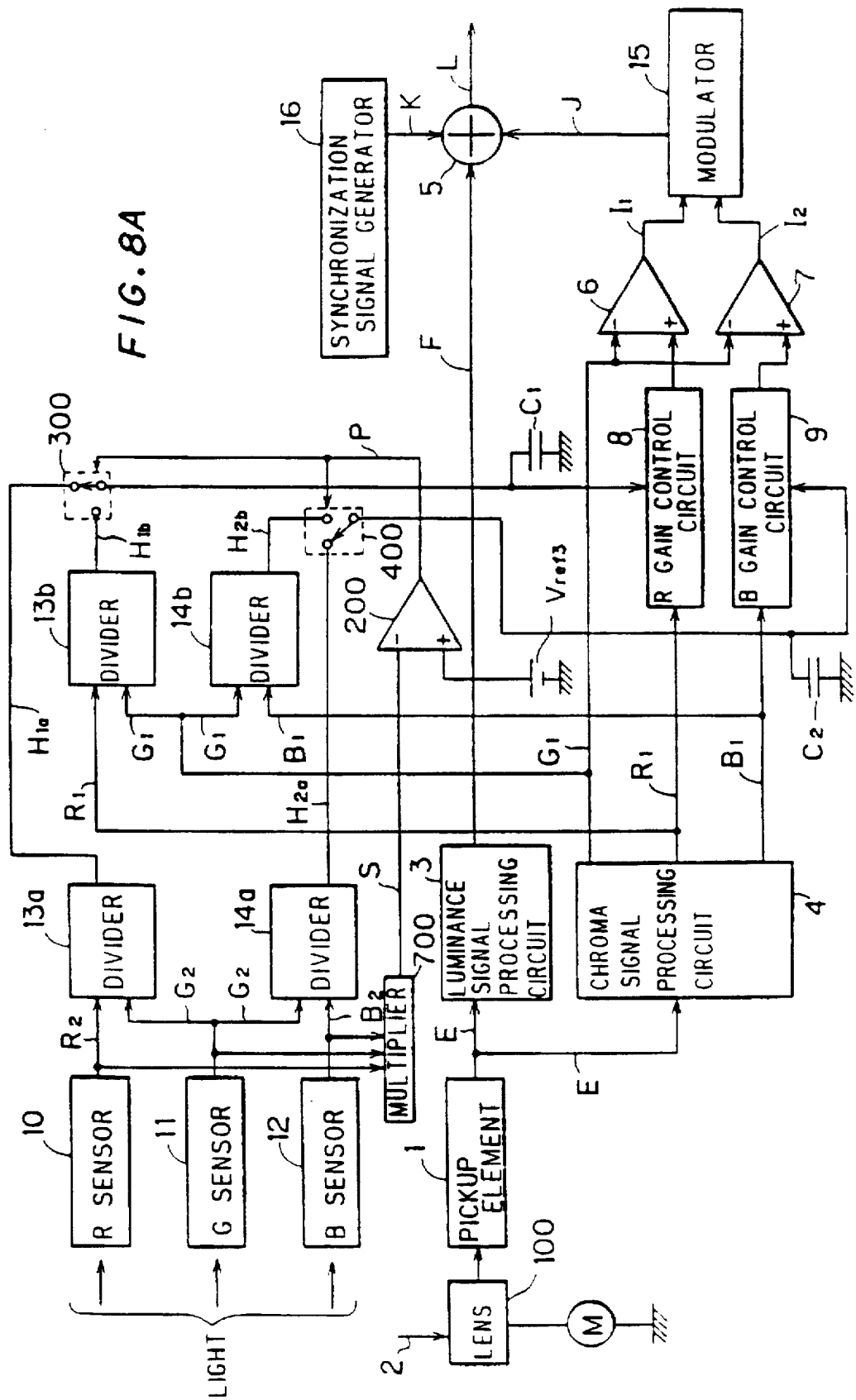

FIG. 8A is a block diagram showing an eleventh embodiment of the automatic white balance regulating device according to the present invention. The device shown in FIG. 8A is different from the device shown in FIG. 7A in that reference voltage $V_{ref3}$ is applied to the input (+) of the comparator 200. In other words, the illuminance of the object is represented by the reference voltage $V_{ref3}$. Other components of the embodiment are the same as those of the embodiment shown in FIG. 7A.

In this embodiment, in shooting a scene of the outdoors from indoors during the day, the reference voltage $V_{ref3}$ is set to the level of the signal S in the critical state where the error in the white balance regulation, caused by the white balance control signals $H_{1a}$, $H_{2a}$, can be recognized in the reproduced object on the television screen, so as to connect the system changeover switches 300, 400 with the dividers 13a, 14a, or with the dividers 13b, 14b. In this way, also, the same effects as in the embodiment of FIG. 7A can be obtained.

FIG. 8B is a block diagram showing a twelfth embodiment of the automatic white balance regulating device according to the present invention. In this embodiment, the reference voltage $V_{ref3}$ as in the embodiment of FIG. 8A is applied to the input (+) of the comparator 200. Similar to the embodiment shown in FIG. 3B, outputs of the comparator 200 are used to switch the signals to be applied to the dividers 620, 630, and hence the same effects as in the embodiment of FIG. 3B can be obtained.

Figure 9A:
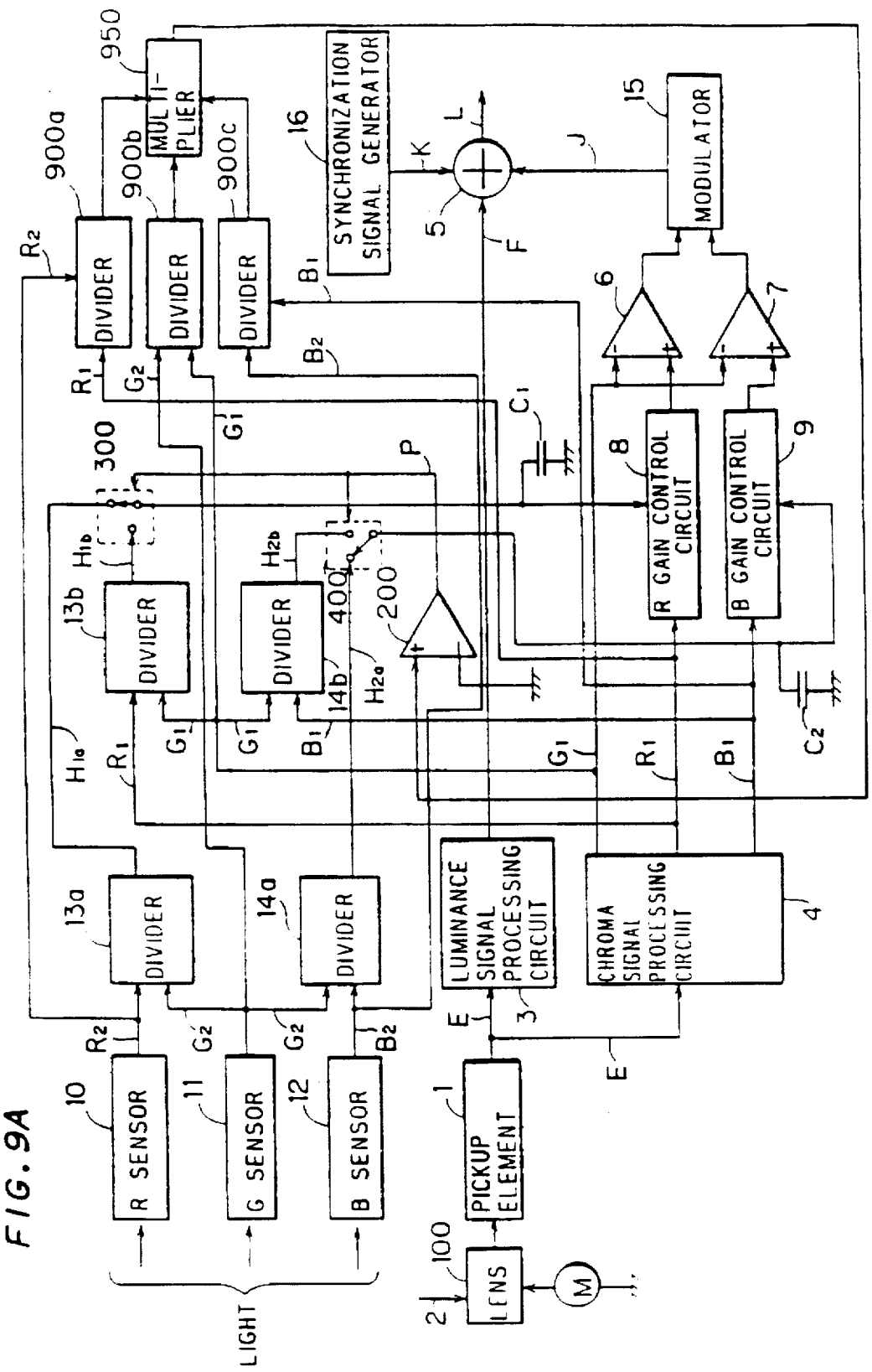

FIG. 9A is a block diagram showing a thirteenth embodiment of the automatic white balance regulating device according to the present invention. The device of this embodiment is different from the device shown in FIG. 3A in that dividers 900a, 900b, 900c and a multiplier 950 are additionally provided, and the comparator 200 has its input (+) connected to an output of the multiplier 950 and its input (−) grounded. The divider 900a logarithmically converts the red signals $R_1$, $R_2$ and subtracts one from the other to output a signal representing the ratio of the signals, the divider 900b logarithmically converts the green signals $G_1$, $G_2$ and subtracts one from the other to output a signal representing the ratio of the signals, and the divider 900c logarithmically converts the blue signals $B_1$, $B_2$ and subtracts one from the other to output a signal representing the ratio of the signals, respectively. A multiplier 950 receives all the ratio signals outputted by the dividers 900a, 900b, 900c and synthesizes a signal to apply it to the input (+) of the comparator 200. The comparator 200 has its input (−) grounded as stated above. In other words, in this embodiment, the illuminance around the place where the video camera is set in position is represented by the output signal of the multiplier 950, and the illuminance of the object is represented by the ground potential. Other components of the embodiment are the same as those of the embodiment shown in FIG. 3A.

In shooting a scene of the outdoors from indoors during the day, since it is brighter outdoors, the ratio signals outputted by the dividers 900a, 900b, 900c are all positive, and the output of the multiplier 950 is also positive. This causes the system changeover signal P outputted by the comparator 200 to turn "high" in level, and the system changeover switches 300, 400 are connected with the chroma signal processing circuit 4 (to choose the pickup color signal processing system). The operation thereafter is the same as in the embodiment shown in FIG. 3A.

In shooting a night scene of the outdoors from indoors, since it is brighter indoors, the ratio signals outputted by the dividers 900a, 900b, 900c are all negative, and the output of the multiplier 950 is also negative. This causes the system changeover signal P outputted by the comparator 200 to turn "low" in level, and the system changeover switches 300, 400 are connected with the R sensor 10, the G sensor 11 and the B sensor 12 (to choose the color temperature sensor system). The operation thereafter is the same as in the embodiment shown in FIG. 3A.

In shooting the television screen indoors or shooting the object spotlighted indoors, it is usual that the illuminance of the object is larger than the illuminance around the place where the video camera is set in position. Thus, the ratio signals outputted by the dividers 900a, 900b, 900c are all positive, and the output of the multiplier 950 is also positive. This causes the system changeover signal P outputted by the comparator 200 to turn "high" in level. In response to the "high" level, the system changeover switches 300, 400 are connected with the chroma signal processing circuit 4 (to choose the pickup color signal processing system), and the white balance regulation as stated above is performed. In this embodiment, also, the same effects as in the embodiment shown in FIG. 3A can be obtained.

Figure 9B:
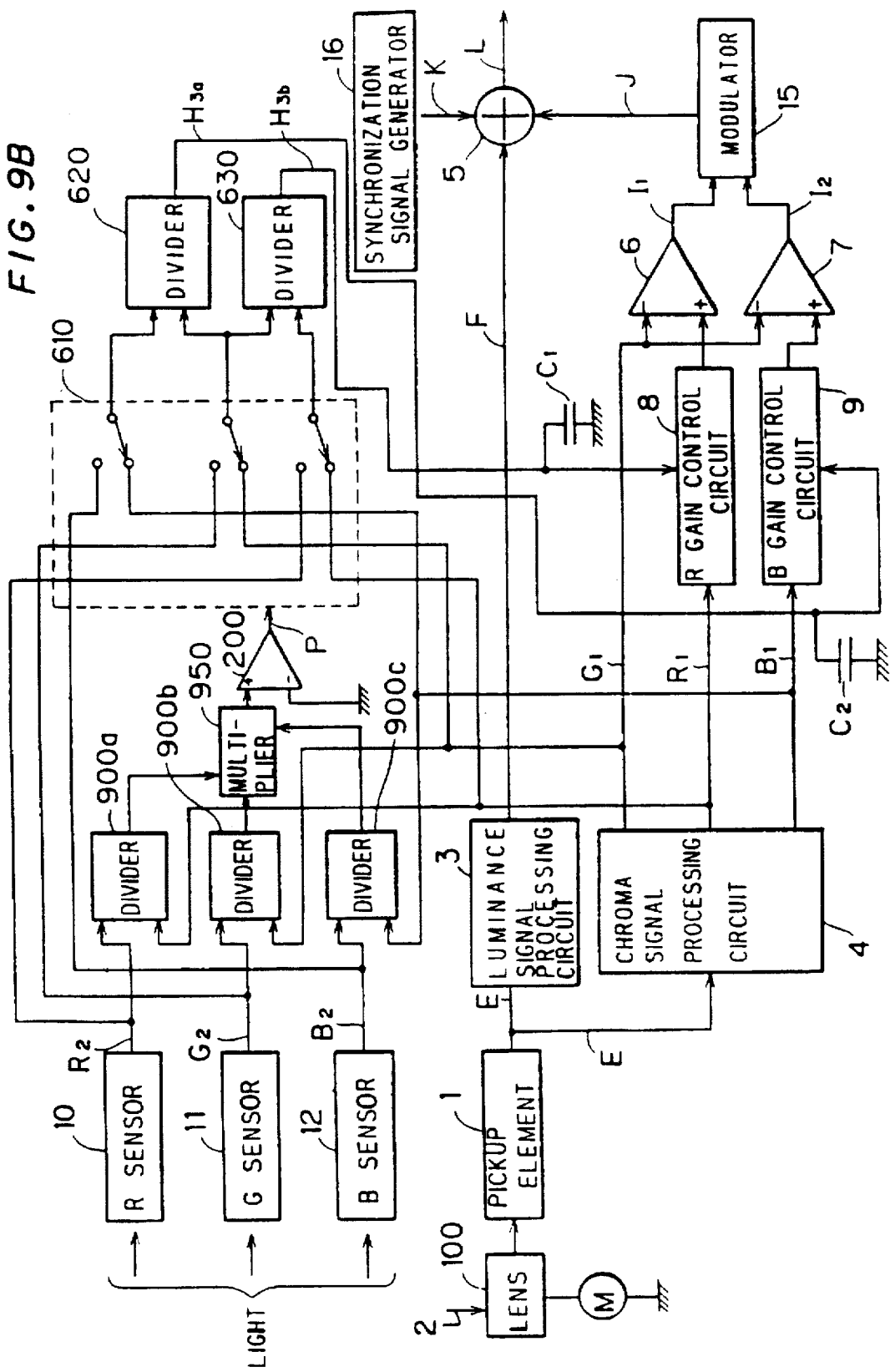

FIG. 9B is a block diagram showing a fourteenth embodiment of the automatic white balance regulating device according to the present invention. Similar to the embodiment shown in FIG. 9A, the device of this embodiment is provided with the dividers 900a, 900b, 900c and the multiplier 950. Also similar to the embodiment shown in FIG. 3B, outputs of the comparator 200 are used to switch the signals to be applied to the dividers 620, 630, and hence the same effects as in the embodiment shown in FIG. 3B can be obtained.

As has been described, according to the embodiments shown in FIGS. 3A to 9B, the inconvenience arising in shooting a scene of the outdoors from the room can be avoided.

Figure 10A:
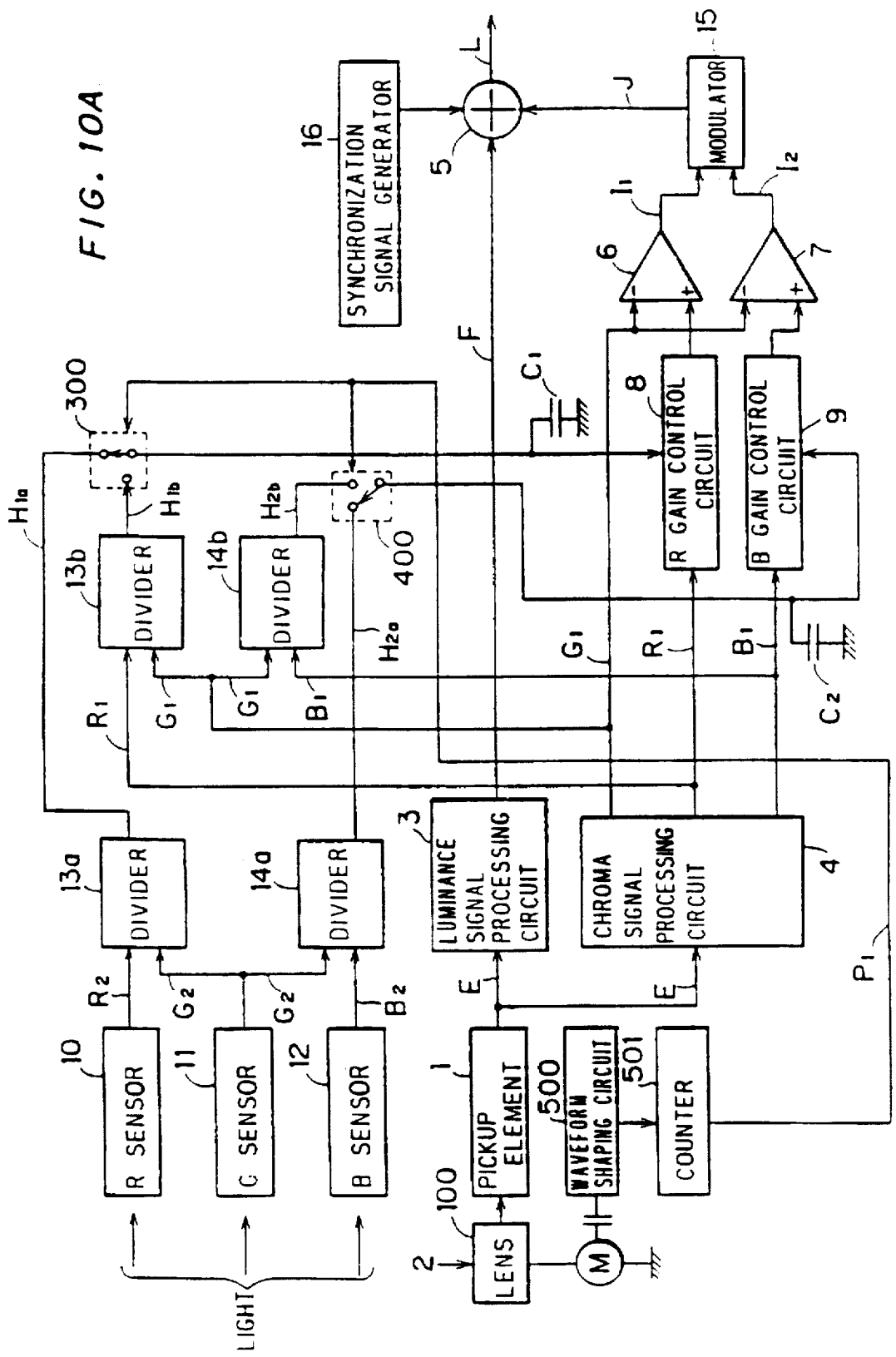

FIGS. 10A and 11A are block diagrams showing fifteenth and sixteenth embodiments of the automatic white balance regulating device according to the present invention. These embodiments are so structured that the inconvenience in zooming in or out can be avoided, as stated below. The device shown in FIG. 10A is different from the device shown in FIG. 3A in that the comparator 200 is removed, and a waveform shaping circuit 500 and a counter 501 are additionally provided. The waveform shaping circuit 500 is connected to the motor M, while the counter 501 is connected to the waveform shaping circuit 500 and the system changeover switches 300, 400.

Figure 10B:
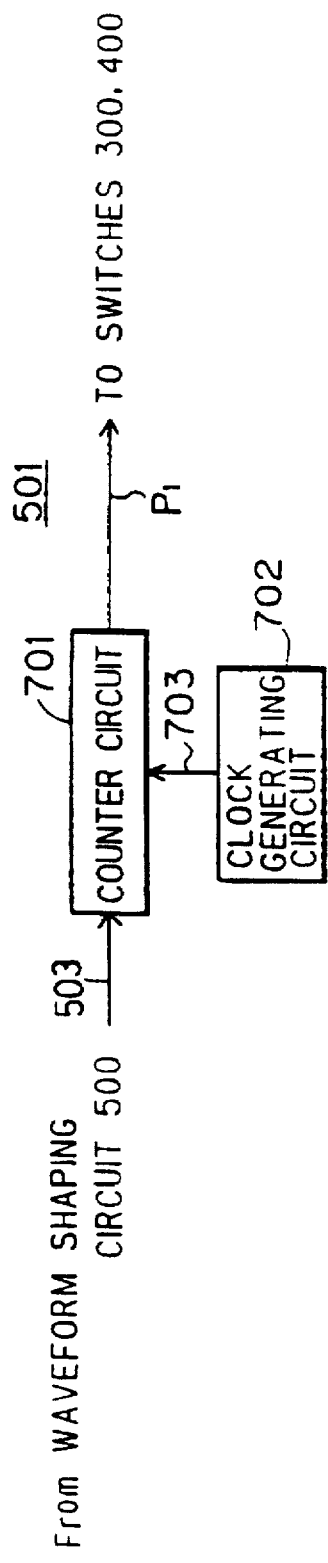
FIG. 10B is a block diagram showing an example of a structure of a counter.

FIG. 10B is a block diagram showing an example of The structure of The counter 501. A counter circuit 701 receives a clock (referred to as CLK hereinafter) 703 from a clock generating circuit 702 and counts the applied CLK 703. The counter circuit 701 is also reset in synchronization with a CLK 503 received from the waveform shaping circuit 500.

Figure 10C:
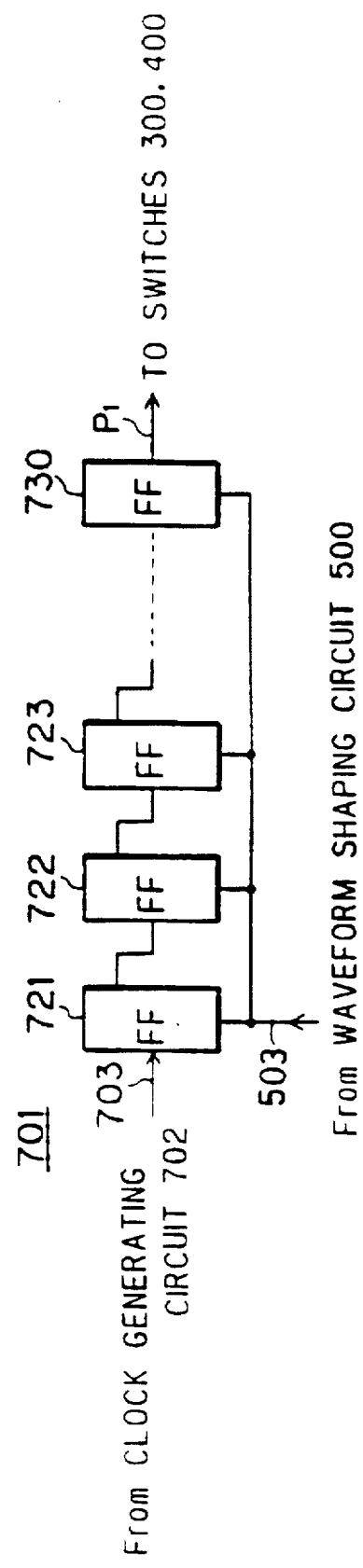
FIG. 10C is a block diagram showing an example of a structure of a counter circuit.

FIG. 10C is a block diagram showing an example of the structure of the counter circuit 701. Ten flip flops (referred to as FF(s) hereinafter) 721, 722, 723, . . . 730 are connected in series. The FF 721 receives the CLK 703 from the clock generating circuit 702, while the FF 722 to FF 730 receive the output from the FF in the respective previous stages. The CLK 503 outputted by the waveform shaping circuit 500 is applied to a reset input of each of the FFs 721 to 730. The output of each of the FF 721 to FF 730 is inverted every time the inputted CLK rises. In other words, each of the FF 721 to FF 730 outputs a single CLK every time two CLKs are inputted. Thus, $(½)×(½)×...×(½)=(½)^{10}=1/1024$ is satisfied, and the FF 730 outputs a single CLK when 1024 CLKs 703 are inputted to FF 721.

In shooting an object with a color video camera in a large space of the outdoors, usually the screen is varied by zooming in and out. In order to zoom in and out, the lens 100 must be moved by the motor M. When the motor M works, a noise pulse is generated. The waveform shaping circuit 500 shapes the noise pulse generated when the motor M works into a perfect square wave (CLK 503) and then outputs it. The counter 501 applies a system changeover signal $P_1$ to the system changeover switches 300, 400 in response to the CLK 503 received from the waveform shaping circuit 500. The system changeover signal $P_1$ turns "high" in level when the CLK 503 is not applied for a specific period of time, and otherwise it turns "low" in level. The system changeover switches 300, 400 change the connections in accordance with the level of the system changeover signal $P_1$. Other components of this embodiment are the same as those of the embodiment shown in FIG. 3A.

First, zooming in outdoors will be discussed. There stands a person in a red sweater on a green lawn. Fully zooming in on the person makes most part of the video screen (90% or more of the screen) red. Zooming in causes the motor M to work and the noise pulse is generated. In response to it, the waveform shaping circuit 500 outputs the CLK 503. Accordingly, the counter circuit 701 (FF 721 to FF 730) is reset before the number of the CLK 703 applied to the counter circuit 701 has come to be 1024, and the system changeover signal $P_1$ turns "low" in level. In response to the "low", the system changeover switches 300, 400 are connected with The dividers 13a, 14a (to choose the pickup color signal processing system), and the white balance control signals $H_{1a}$ and $H_{2a}$ are applied to the R gain control circuit 8 and the B gain control circuit 9, respectively, to perform the white balance regulation. Specifically, the white balance regulation is performed based not upon the light 2 reflected by the object but upon the light from the light source which illuminates the object.

Next, zooming out outdoors will be discussed. In shooting a person in a red sweater on a green lawn, zooming out makes most part of the video screen (90% or more of the screen) green. Fully zooming out causes the motor M to work, and a noise pulse is generated. The operation thereafter is the same as in the aforementioned case of zooming in. In this case also, similar to the case of zooming in, the white balance regulation is performed based not upon the light 2 reflected by the object but upon the light from the light source which illuminates the object.

With each of the CLK 703 generated by the clock generating circuit 702 every 0.3 second, zooming in or out the state is retained for a considerable period of time (0.3×1024 (in seconds)=5 (in minutes) until the switches 300, 400 change the connections, and there arises no inconvenience.

In this way, the white balance regulation in zooming in or out is performed based not upon the light 2 reflected by the object as in the pickup color signal processing system but upon the light from the light source which illuminates the object, and hence no error arises in the white balance regulation.

On the other hand, without zooming in or out, the motor M does not work, and a noise pulse is not generated. Thus, the waveform shaping circuit 500 does not output the CLK 503, and the counter 501 is not reset. After the state is retained for a specific period of time, the system changeover signal $P_1$ turns "high" in level. In response to the "high" of the system changeover signal $P_1$, the system changeover switches 300, 400 are connected with the dividers 13b, 14b (to choose the color temperature sensor system). The white balance control signals $H_{1b}$, $H_{2b}$ are applied to the R gain control circuit 8 and the B gain control circuit 9, respectively. Not zooming in or out, there is no possibility that most part of the screen (90% or more of the screen) lies in a single color. Thus, even when the white balance regulation is performed based upon the white balance control signals $H_{1b}$, $H_{2b}$ corresponding to the light 2 reflected by the object, no error arises in the white balance regulation.

The device shown in FIG. 11A is different from the device shown in FIG. 10A in that the counter 501 is removed, and a charging and discharging circuit 502 is additionally provided. The output of the waveform shaping circuit 500 is applied to the charging and discharging circuit 502, while the output of the charing and discharging circuit 502 is applied to the input (+) of the comparator 200, respectively. Reference voltage $V_{ref4}$ is applied to the input (−) of the comparator 200. Other components of this embodiment are the same as those of the embodiment in FIG. 10A.

Figure 11B:
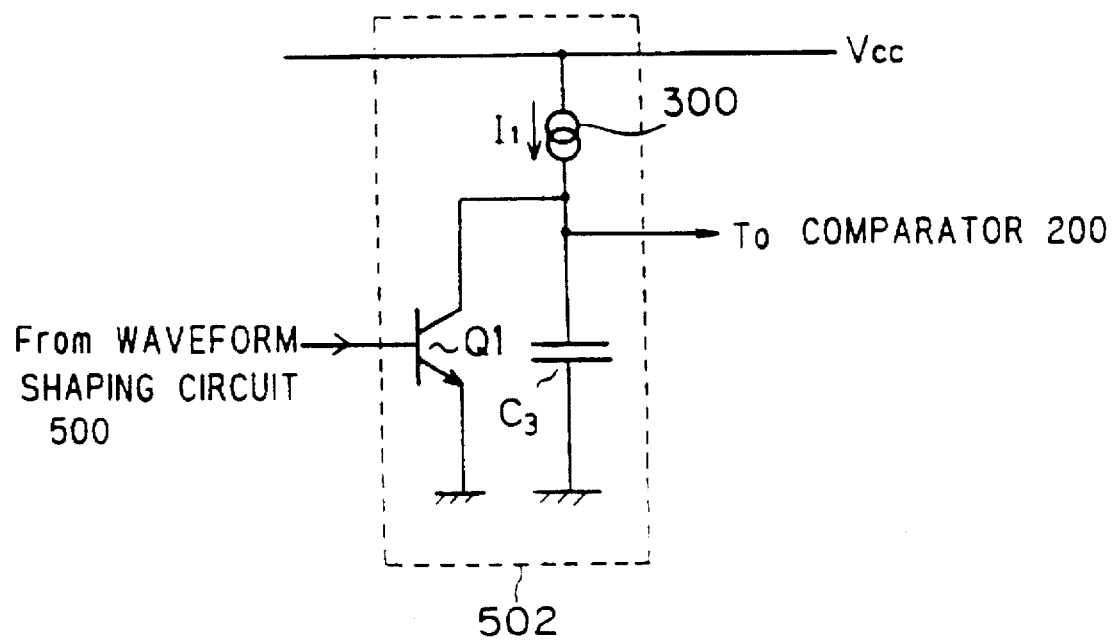
FIG. 11B is a circuit diagram showing an example of a structure of a charging/discharging circuit.

FIG. 11B is a circuit diagram showing an example of the structure of the charging and discharging circuit 502. The charging and discharging circuit 502 consists of an NPN transistor Q1, a capacitor $C_3$ and a constant current source 300. The constant current source 300 and the capacitor $C_3$ are connected between the power source $V_{CC}$ and the ground in series. The transistor Q1 has its base connected to the waveform shaping circuit 500, its collector connected to the common junction of the constant current source 300 and the capacitor $C_3$ and its emitter grounded. The capacitor $C_3$ is charged or discharged in accordance with ON/OFF of the transistor Q1.

The operation will be described. In order to zoom in or out, the lens 100 must be moved by the motor M as stated above. When the motor M works, a noise pulse is generated, and the waveform shaping circuit 500 shapes the noise pulse into a square wave to apply it to the charging and discharging circuit 502. The charging and discharging circuit 502 alternately charges and discharges corresponding to the level of the square wave. Charging voltage R of the charging and discharging circuit 502 is applied to the input (+) of the comparator 200. The comparator 200 applies the system changeover signal P of "high" in level to the system changeover switches 300, 400 when the charging voltage R is larger than the reference voltage $V_{ref4}$, and applies the system changeover signal P of "low" in level to the system changeover switches 300, 400 when the charging voltage R is smaller. Herein, the reference voltage $V_{ref4}$ corresponds to the voltage in the case of zooming in or out on an object until a single color occupies most part of the screen (for example, 90% or more of the screen).

Fully zooming in outdoors will be discussed first. Fully zooming in in the shooting situation similar to that explained in the context of the device shown in FIG. 10A, most part of the screen lies red as mentioned above. Fully zooming in makes the working time of the motor M longer, and the noise pulse generated by the motor M increases in number. Corresponding to it, the waveform shaping circuit 500 outputs many CLKs. The CLKs are applied to the base of the transistor Q1. The transistor Q1 turns on for a period of time when the CLKs are "high" in level, while the capacitor $C_3$ is discharged for an instant. When the motor M does not work, the transistor Q1 turns off, while the capacitor $C_3$ is charged by a constant current source $I_1$. The capacitor $C_3$ is discharged many times, and hence the charging voltage R of the capacitor $C_3$ is smaller than the reference voltage $V_{ref4}$. Consequently, the system changeover signal P outputted by the comparator 200 turns "low" in level. In response to the "low", the system changeover switches 300, 400 are connected with the dividers 13a, 14a (to choose the pickup color signal processing system), respectively. The white balance control signal $H_{1a}$ is applied to the R gain control circuit 8, while the white balance control signal $H_{2a}$ is applied to the B gain control circuit 9. In other words, the white balance regulation is performed based upon the light 2 from the light source which illuminates the object.

Next, fully zooming out outdoors will be discussed. Fully zooming out in the shooting situation similar to that explained in the context of the device shown in FIG. 10A, most of the screen lies green as mentioned above. Fully zooming out makes the working time of the motor M longer, and the noise pulse increases in number. This causes the charging voltage R of the capacitor $C_3$ to be reduced, as stated above, and it comes to be smaller than the reference voltage $V_{ref4}$. This makes the system changeover signal P turn "low" in level, and as a result, the system changeover switches 300, 400 are connected with the dividers 13a, 14a (to choose the pickup color signal processing system), respectively. Thus, similar to the above description, the white balance regulation is performed based upon the light from the light source which illuminates the object.

Thus, in fully zooming in or out, similar to the device shown in FIG. 10A, since the white balance regulation is performed based upon the light from the light source which illuminates the object, the same effects as in the device shown in FIG. 10A can be obtained.

Setting the capacity of the capacitor $C_3$ to 100 μF, the constant current $I_1$ to 1 μA and the reference voltage $V_{ref4}$ to 4 V, the time t required for completely charging the capacitor $C_3$ is obtained as follows:

$$t = \frac{100 \times 10^{-6} \times 4}{1 \times 10^{-6}} = 400 \text{ (in seconds)}$$
$$= 6 \text{ minutes } 40 \text{ seconds}$$

Accordingly, zooming in or out on the object and continuing the situation causes no inconvenience that the system changeover switches 300, 400 change the connections to choose the color temperature sensor system.

Next, slightly zooming in or out without zooming in or out in shooting outdoors will be discussed. Slightly zooming in or out on an object causes the motor M to work, and the noise pulse is generated and the charging voltage R is reduced. However, since neither zooming in nor out is fully performed, the charging voltage R is larger than the reference voltage $V_{ref4}$. This causes the system changeover signal P outputted by the comparator 200 to turn "high" in level. On the other hand, when neither zooming in nor out is performed, the motor M does not work, nor the the noise pulse is not generated. Thus, the charging voltage R of the capacitor $C_3$ reaches the maximum, and the system changeover signal P outputted by the comparator 200 also turns "high" in level.

In response to the "high" of the system changeover signal P, the system changeover switches 300, 400 are connected with the dividers 13b, 14b (to choose the color temperature sensor system). Then, the white balance regulation is performed in response to the white balance control signals $H_{1b}$, $H_{2b}$. Since neither zooming in nor out is fully performed, there is no possibility that most of the screen (90% or more) lies in a single color. Thus, there arises no error in the white balance regulation even when the white balance regulation is performed based upon the white balance control signals $H_{1b}$, $H_{2b}$ corresponding to the light 2 reflected by the object.

As has been described, in the embodiments shown in FIGS. 10A and 11A, the inconvenience arising in zooming in or out can be avoided.

Figure 12:
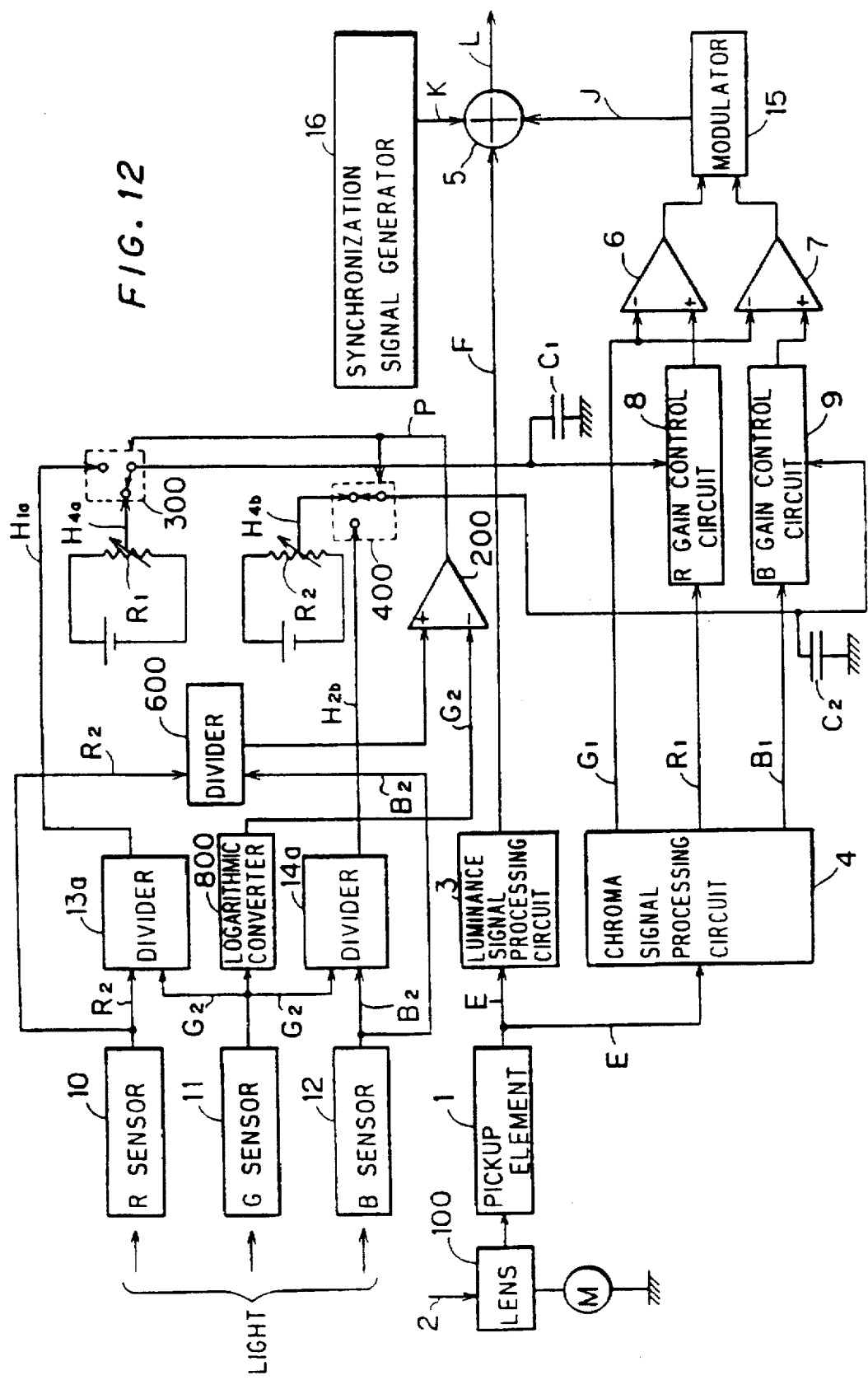
Figure 13:
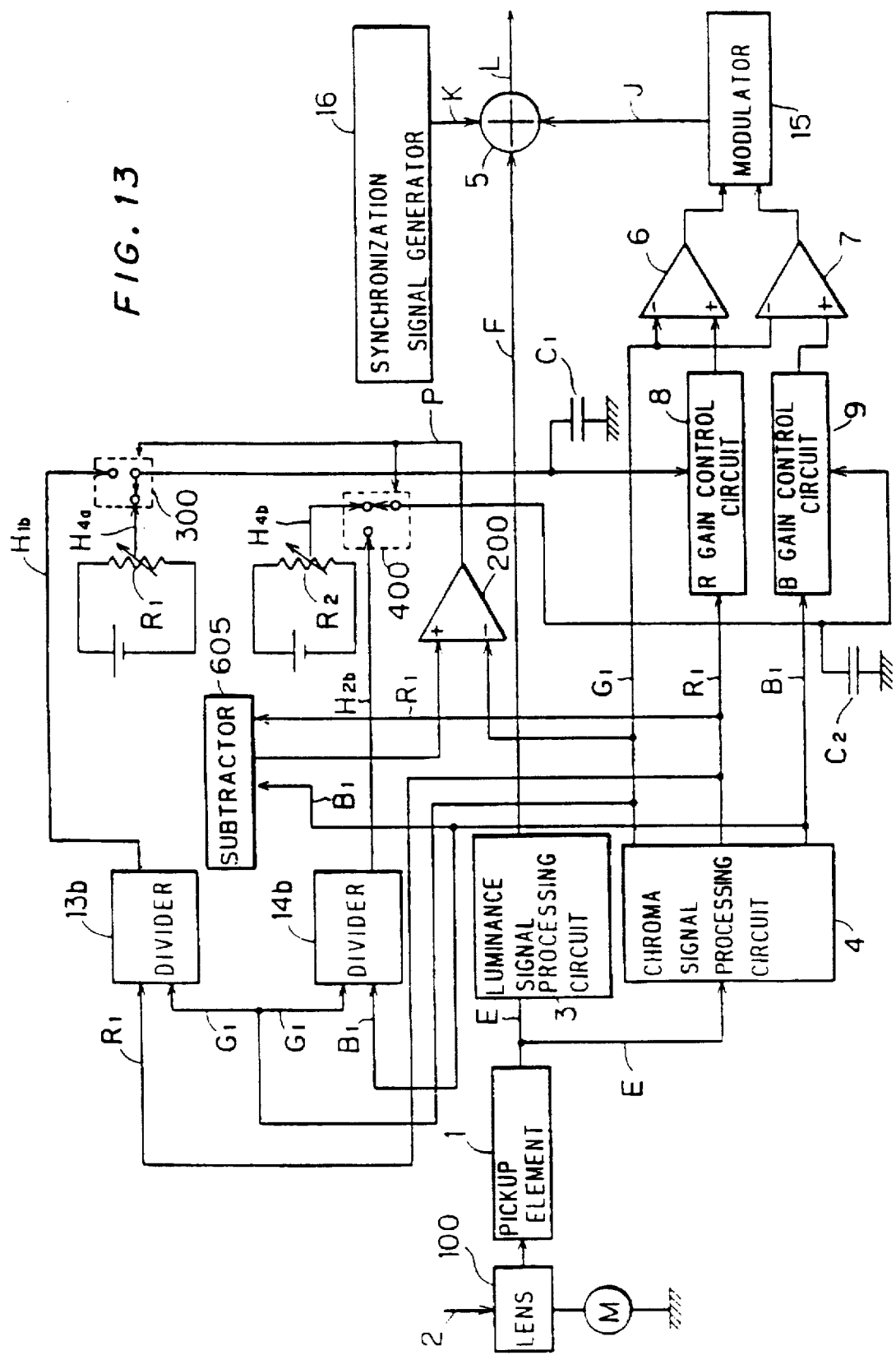

FIGS. 12 and 13 are block diagrams showing seventeenth and eighteenth embodiments of the automatic white balance regulating device according to the present invention. The automatic white balance regulating device is so structured that the inconvenience arising in shooting a scene at sunset with a color video camera can be avoided. In the embodiment of FIG. 12, a color temperature sensor system and a manual operating system are provided as the white balance regulating system, and automatic switching between the two systems works in accordance with the situation. In the embodiment of FIG. 13, a pickup color signal processing system and a manual operating system are provided as the white balance regulating system, and automatic switching between the two systems works in accordance with the situation.

In FIG. 12, a divider 600 logarithmically converts the red signal $R_2$ and the blue signal $B_2$ and subtracts one from the other to output a signal representing the ratio of the signals. The comparator 200 compares the output of the divider 600 with the green signal $G_2$ logarithmically converted by a logarithmic converter 800, and applies the system changeover signal P corresponding to the comparison result to the system changeover switches 300, 400.

In FIG. 13, a subtractor 605 makes the difference between the red signal $R_1$ and the blue signal $B_1$ to apply it to the comparator 200. The comparator 200 compares the output of the subtractor 605 with the green signal $G_1$, and applies the system changeover signal P corresponding to the comparison result to the system changeover switches 300, 400.

Then the operation will be described. In shooting a scene at sunset, the red signals $R_1$, $R_2$ significantly increase in level, while the blue signals $B_1$, $B_2$ significantly decrease in level. The divider 600 in the embodiment in FIG. 12 outputs a signal representing the ratio of the red signal $R_2$ to the blue signal $B_2$, while the subtractor 605 in the embodiment of FIG. 13 outputs the signal representing the difference between the red signal $R_1$ and the blue signal $B_1$. Since the levels of the red signals $R_1$, $R_2$ are considerably higher than the levels of the blue signals $B_1$, $B_2$ at sunset, as stated above, the level of the ratio signal or the difference signal is also higher. The levels of the signals representing the ratios of the red signals to the blue signals and the signals representing the differences between the former and the latter are higher than the level of the green signal $G_1$ or the green signal $G_2$, the system changeover signal P outputted by the comparator 200 turns "high" in level. In response to the "high", the system changeover switches 300, 400 are connected with variable resistances $R_1$, $R_2$ (to choose the manual operating system). The variable resistances $R_1$, $R_2$ are manually regulated so as to regulate white balance control signals $H_{4a}$, $H_{4b}$ in level and to regulate the R gain control circuit 8 and the B gain control circuit 9 in gain. Thus, the scene at sunset can be shot by the video camera in the same coloring and shades with the scene at sunset which is recognized by naked eyes, by manually performing the white balance regulation.

Meanwhile, in shooting not the sunset but an ordinary scene, the differences in level between the red signal $R_1$ and the blue signal $B_1$ and between the red signal $R_2$ and the blue signal $B_2$ are not significantly large. Thus, the signals representing the ratio of the red signal $R_1$ to the blue signal $B_1$ and the ratio of the red signal $R_2$ to the blue signal $B_2$ and the difference signals therebetween are smaller in level than the green signals $G_1$, $G_2$, and the system changeover signal P outputted by the comparator 200 turns "low" in level. In response to the "low", the system changeover switches 300, 400 are connected with the dividers 13a, 14a in the embodiment of FIG. 12, while they are connected with the dividers 13b, 14b in the embodiment of FIG. 13, and the white balance regulation is performed based upon the white balance control signals $H_{1a}$, $H_{2a}$ or $H_{1b}$, $H_{2b}$. As mentioned above, in this embodiment, since the white balance regulation is manually performed in shooting the scene at sunset, there is no possibility that the scene at sunset is shot as if it were not a scene at sunset but an ordinary scene. As mentioned above, according to the embodiments of FIGS. 12 and 13, the inconvenience arising in shooting the scene at sunset can be avoided.

Figure 14:
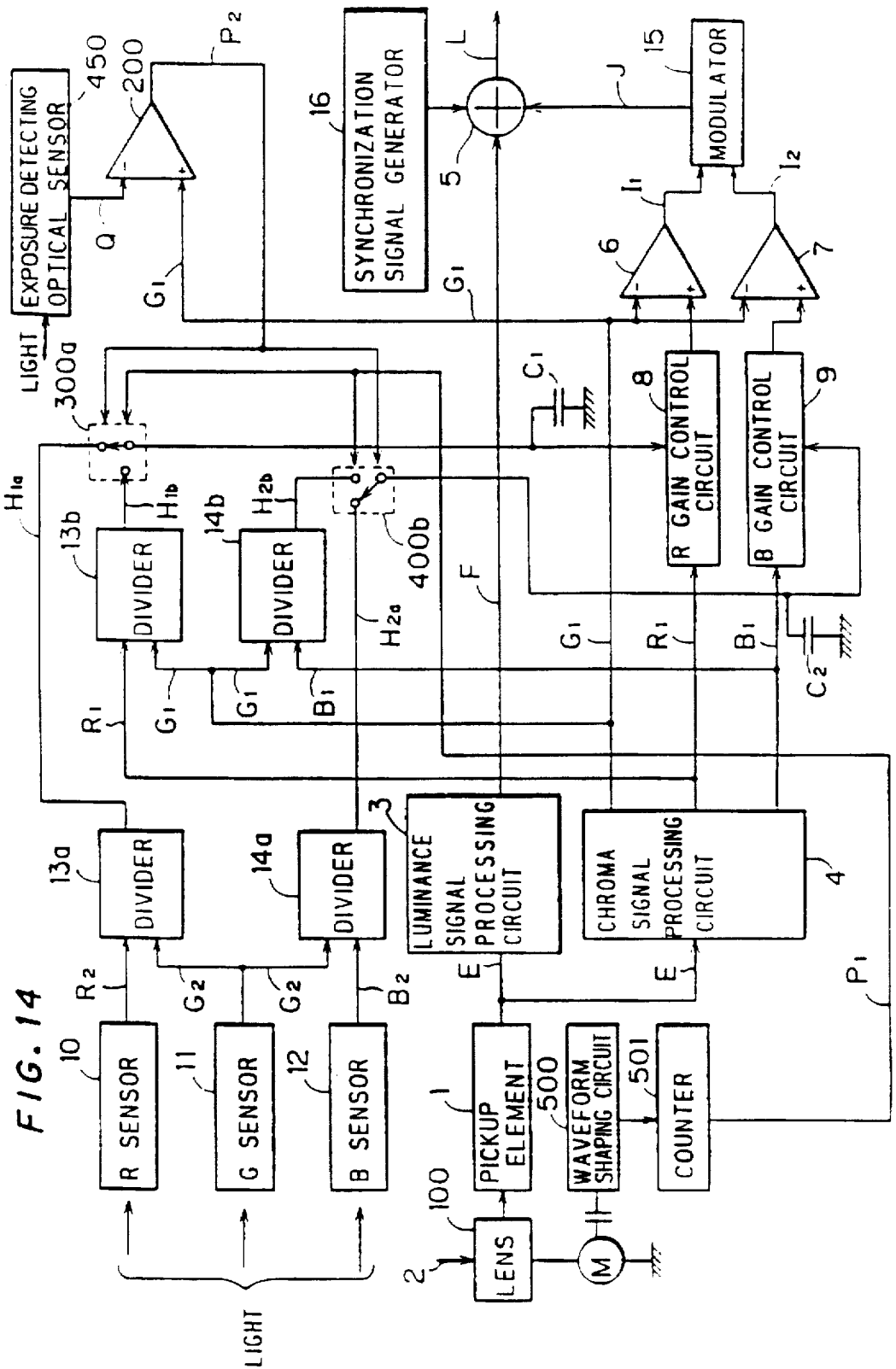
Figure 15:
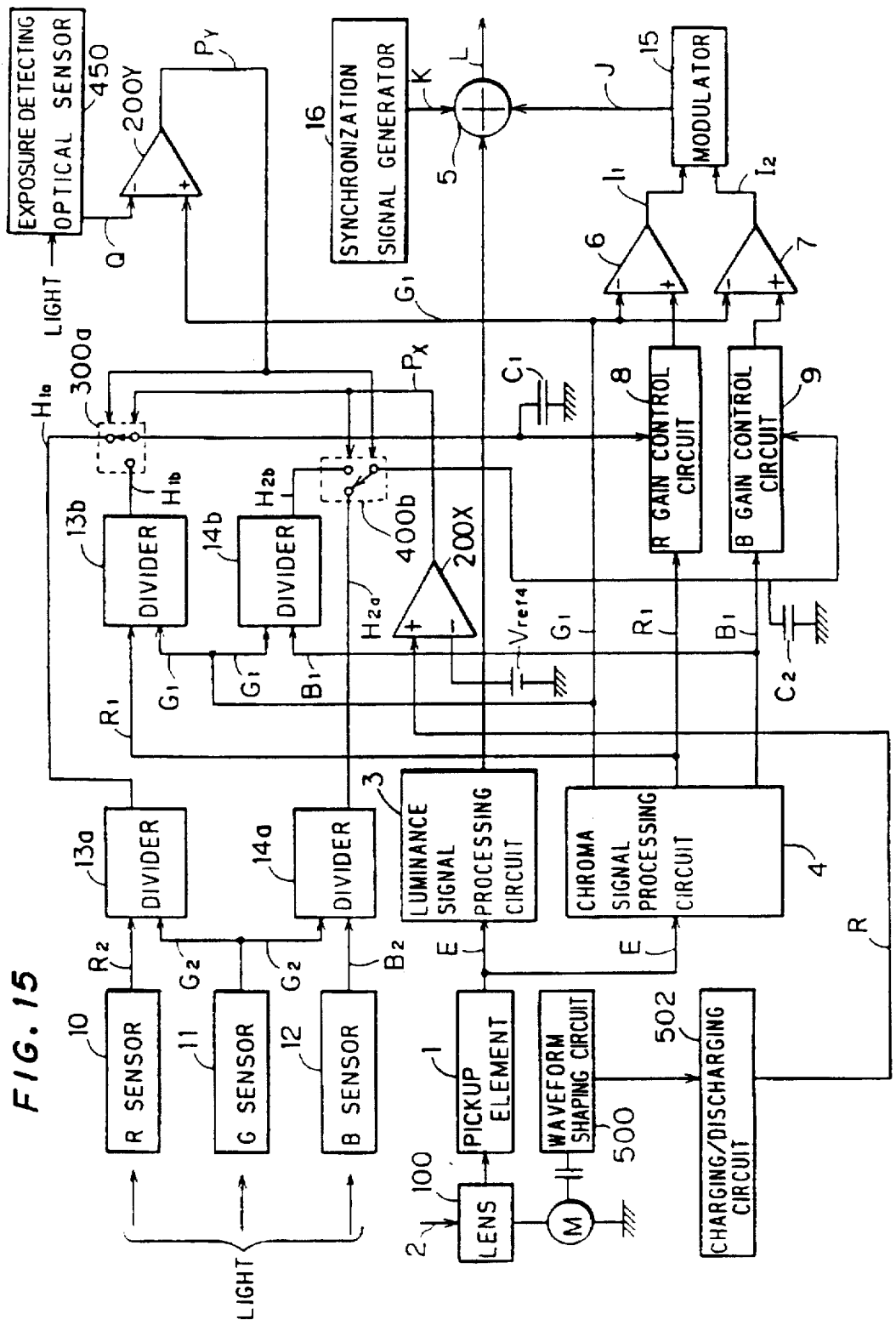

FIGS. 14 and 15 are block diagrams showing nineteenth and twentieth embodiments of the automatic white balance regulating device according to the present invention. The embodiments are so structured that the inconvenience in shooting a scene of the outdoors from the room in day and the inconvenience in zooming in or out can be avoided.

The embodiment of FIG. 14 is a combination of the embodiment of FIG. 5A and the embodiment of FIG. 10A, having common circuits and elements. The switches 300, 400 are modified into switches 300a, 400b in this embodiment. The switches 300a, 400b are connected with the dividers 13b, 14b only when the inputs from both the counter 501 and the comparator 200 turn "high" in level.

In the embodiment in FIG. 14, shooting a scene of the outdoors from the room through the window in day without zooming in nor out will be discussed. As stated in the context of the embodiment of FIG. 10A, the system changeover signal $P_1$ outputted by the counter 501 turns "high" in level. In the shooting situation as mentioned above, outdoors is brighter than indoors. Thus, the green signal $G_1$ is larger than the exposure signal Q in level. This causes a system changeover signal $P_2$ outputted by the comparator 200 turns "high" in level. Then, the system changeover switches 300a, 400b are connected with the dividers 13b, 14b. In this way, the white balance regulation is performed based upon the light 2 reflected by the object, and hence no error arises in the white balance regulation.

Then, shooting the scene of the outdoors with zooming in or out will be discussed. Zooming in or out causes the system changeover signal $P_1$ from the counter 501 to turn "low" in level. Then, the system changeover switches 300a, 400b are connected with the dividers 13a, 14a. The white balance regulation is performed based upon the light around the place where the video camera is set in position, and thus no error arises because of zooming in or out.

FIG. 15 is a combination of the embodiment of FIG. 5A and the embodiment of FIG. 11A, having common circuits and elements. The switches 300a, 300b work in the same way as in the embodiment of FIG. 14.

In the embodiment of FIG. 15, the operation in shooting a scene of the outdoors from the room through the window in day without fully zooming in nor out is the same as in the embodiment of FIG. 5A, while the operation in shooting the scene with fully zooming in or out is the same as in the embodiment of FIG. 11A. Specifically, in shooting a scene of the outdoors from the room through the window in day without fully zooming in nor out, the charging voltage R of the charging/discharging circuit 502 is larger than the reference voltage $V_{ref}$ for the same reason as stated in the context of the embodiment of FIG. 11A. Naturally, a system changeover signal $P_X$ outputted by a comparator 200X turns "high" in level. Meanwhile, since it is brighter outdoors than it is indoors, a system changeover signal $P_Y$ outputted by a comparator 200Y turns "high" in level similar to the embodiment in FIG. 14, and then the system changeover switches 300, 400 are connected with the dividers 13b, 14b. Thus, the same operation as in the embodiment of FIG. 14 is performed.

In fully zooming in or out, the charging voltage R is smaller than the reference voltage $V_{ref}$ as mentioned in the context of the embodiment of FIG. 11A, and the system changeover signal $P_X$ turns "low" in level. Naturally, the system changeover switches 300a, 400b are connected with the dividers 13a, 14a, and the same effects as in the embodiment of FIG. 14 can be obtained.

Figure 16A:
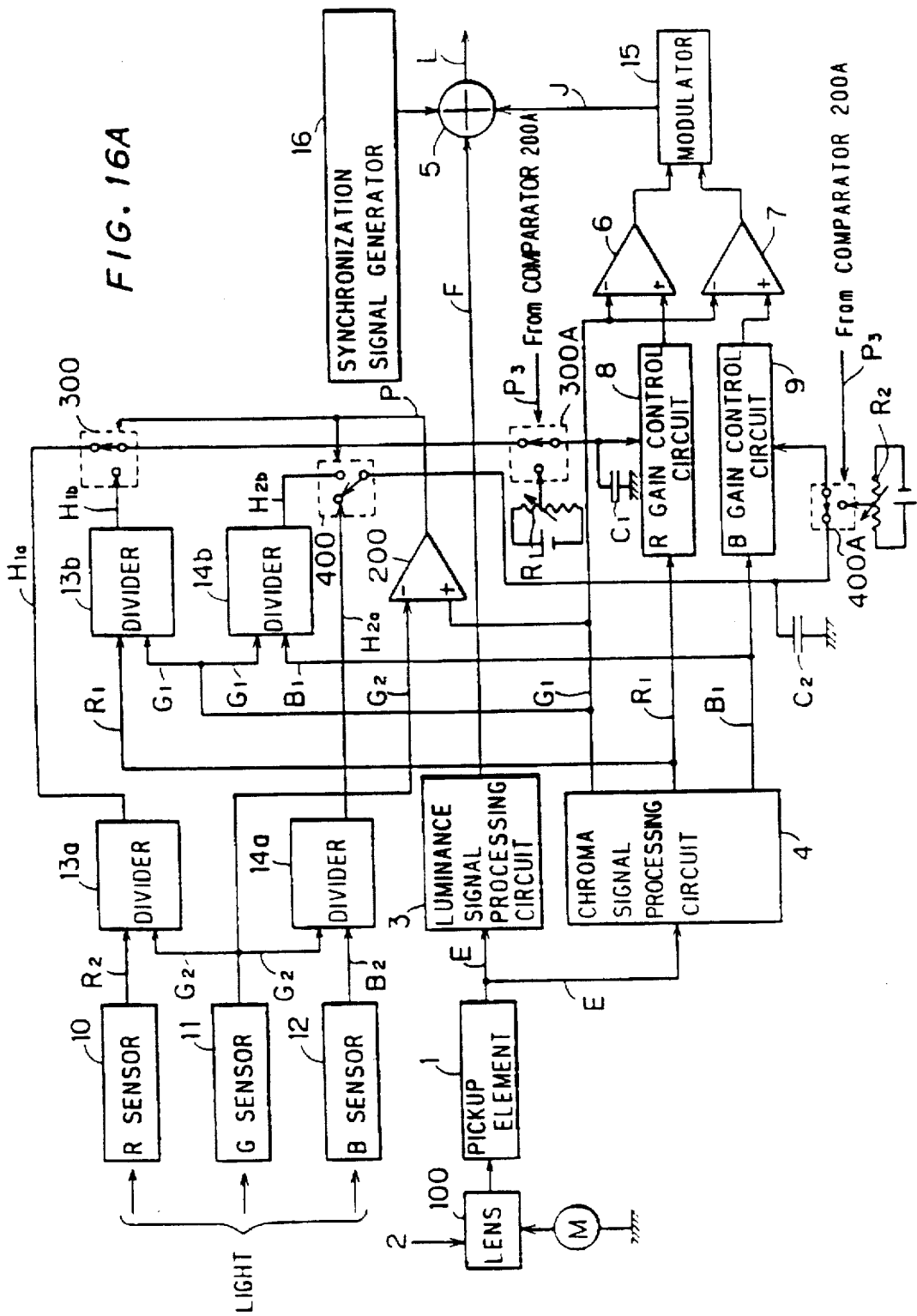
Figure 16B:
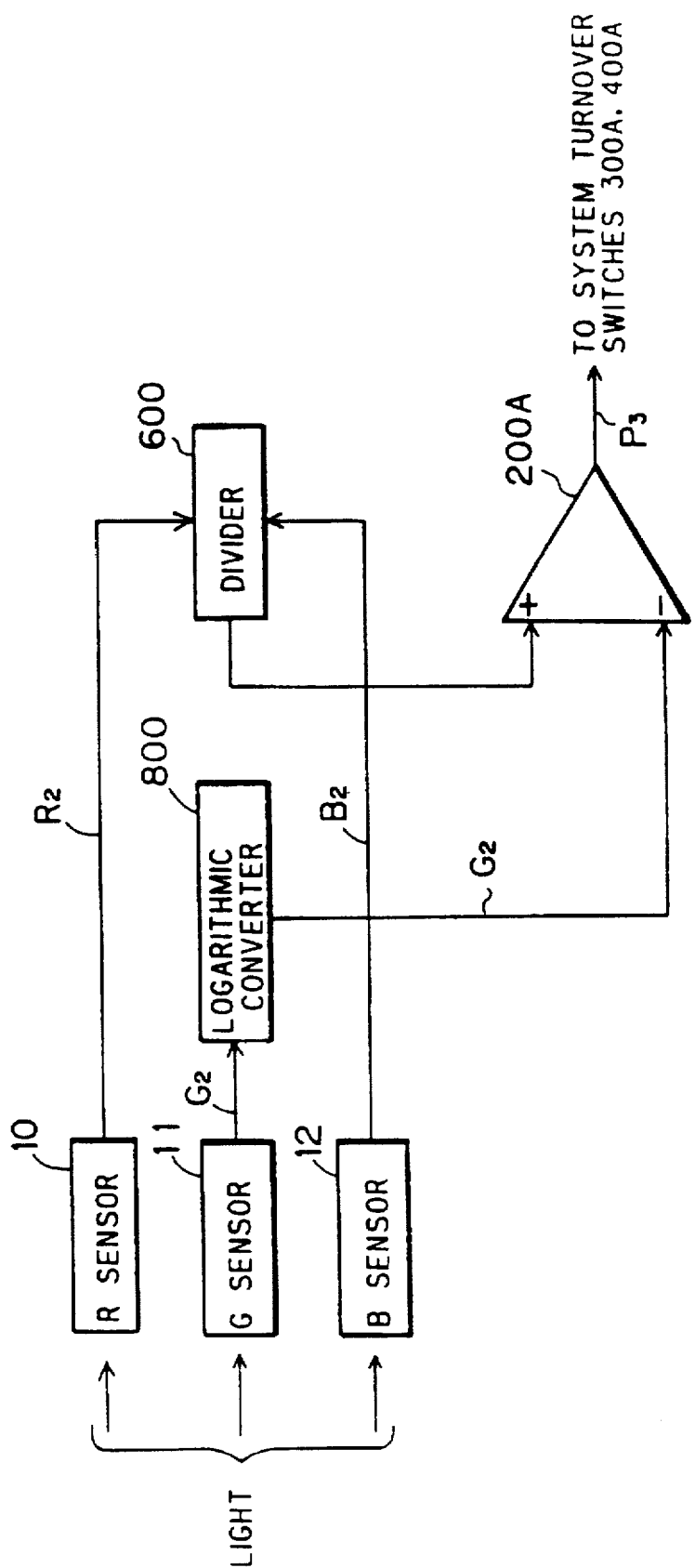

FIGS. 16A and 16B are block diagrams showing a twenty-first embodiment of the automatic white balance regulating device according to the present invention. FIGS. 16A and 16B together compose the automatic white balance regulating device. The embodiment is so structured that the inconvenience which arises in shooting a scene of the outdoors from the room in day and the inconvenience which arises in shooting a scene at sunset can be avoided. In this embodiment, the embodiment of FIG. 3A is combined with the embodiment of FIG. 12, having common circuits and elements. In other words, a comparator 200A, system changeover switches 300A, 400A, variable resistances $R_1$, $R_2$, a divider 600 and a logarithmic converter 800 are newly provided in the device shown in FIG. 3A. The system changeover switch 300A is provided on a path between the system changeover switch 300 and the R gain control circuit 8. The system changeover switch 400A is provided on a path between the system changeover switch 400 and the B gain control circuit 9. The logarithmic converter 800 logarithmically converts the green signal $G_2$ to apply the resultant signal to the input (−) of the comparator 200A. The divider 600 logarithmically converts the red signal $R_2$ and the blue signal $B_2$, subtracts one from the other, and produces a signal representing the ratio of the signals to apply to the input (+) of the comparator 200A. The comparator 200A compares the input (+) and the input (−) and produces a system changeover signal $P_3$ to apply to the system changeover switches 300A, 400A. The system changeover switches 300A, 400A change the connections in accordance with the level of the system changeover signal $P_3$. Other components are the same as those of the embodiment in FIG. 3A.

In shooting a scene of the outdoors from the room, in day the level difference between the red signal $R_2$ and the blue signal $B_2$ is considerably small, compared with the case where a scene at sunset is shot. Thus, the signal representing the ratio of the red signal $R_2$ and the blue signal $B_2$ outputted by the divider 600 is lower than the green signal $G_2$ in level, and the system changeover signal $P_3$ turns "low" in level. In response to the "low", the system changeover switches 300A, 400A change the connections to apply the white balance control signals $H_{1a}$, $H_{1b}$, $H_{2a}$, $H_{2b}$ to the R gain control circuit 8 and the B gain control circuit 9, as shown in FIG. 16A. In the above mentioned shooting situation, since outdoors is brighter than indoors, the green signal $G_1$ is higher than the green signal $G_2$ in level as explained in the context of the embodiment shown in FIG. 3A, and the system changeover signal $G_2$ turns "high" in level. The system changeover switches 300, 400 are connected with the dividers 13b, 14b, and the white balance regulation is performed based upon the light 2 reflected the object, so that the same effects as in the embodiment in FIG. 3A can be obtained.

In shooting a scene at sunset, the rate of the red signal $R_2$ is significantly large, while the rate of the blue signal $B_2$ is significantly small. Therefore, the signal representing the ratio of the red signal $R_2$ to the blue signal $B_2$ is significantly large, and the system changeover signal $P_3$ outputted by the comparator 200A turns "high" in level. In response to the "high", the system changeover switches 300A, 400A are connected with the variable resistances $R_1$, $R_2$. Thus, in shooting the scene at sunset, the R gain control circuit 8 and the B gain control circuit 9 have the respective gains regulated by manually regulating the variable resistances $R_1$, $R_2$ indifferent of switching the system changeover switches 800, 400. In other words, in this embodiment, the inconvenience arising in shooting the scene at sunset can be avoided on preferential basis.

Figure 17B:
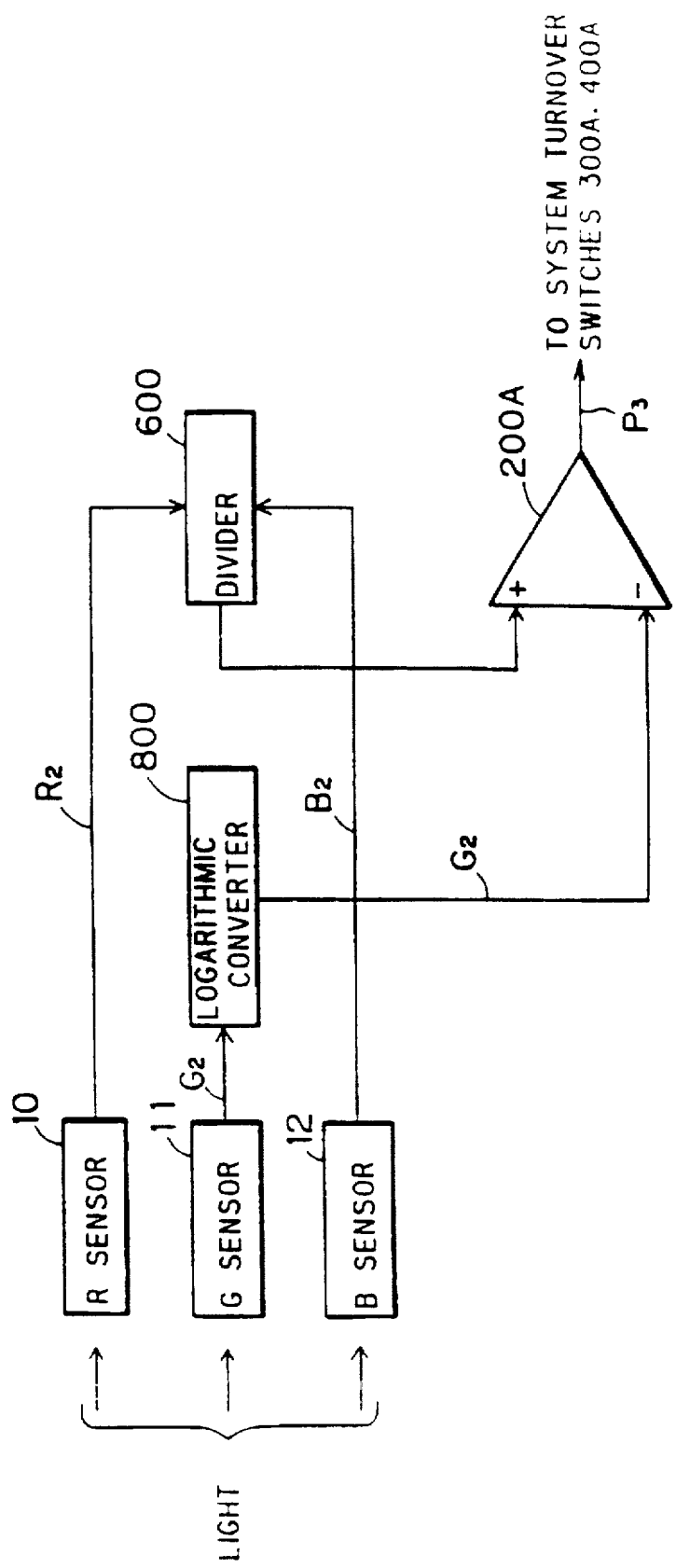

FIGS. 17A and 17B are block diagrams showing a twenty-second embodiment of the automatic white balance regulating device according to the present invention. FIGS. 17A and 17B together compose the automatic white balance regulating device. This embodiment is so structured that the inconvenience in zooming in or out and the inconvenience in shooting a scene at sunset can be avoided. In this embodiment, the embodiment in FIG. 10A and the embodiment in FIG. 12 are combined, having common circuits and elements. Specifically, the comparator 200A, the system changeover switches 300A, 400A, the variable resistances $R_1$, $R_2$, the divider 600 and the logarithmic converter 800 are newly provided in the embodiment in FIG. 10A. These circuits and elements are connected as in the devices shown in FIGS. 16A and 16B. Other components are the same as in the embodiment in FIG. 10A.

Zooming in or out in shooting ordinary scenes (the scenes other than a scene at sunset) will be discussed. Shooting an ordinary scene, the level difference between the red signal $R_2$ and the blue signal $B_2$ is considerably smaller, compared with the case where a scene at sunset is shot. Then, the comparator 200A outputs the system changeover signal $P_3$ at "low" in level as mentioned above. In response to the "low", the system changeover switches 300A, 400A change the connections so as to be able to apply the white balance control signals $H_{1a}$, $H_{1b}$, $H_{2a}$, $H_{2b}$ to the R gain control circuit 8 and the B gain control circuit 9, as shown in FIG. 15A. Fully zooming in or out in this situation, the same effects as in the embodiment in FIG. 10A can be obtained.

On the other hand, in shooting a scene at sunset, the rate of the red signal $R_2$ significantly increases as stated above and the divider 600 significantly increases in output level, and hence the system changeover signal $P_3$ turns "high" in level. In response to the "high", the system changeover switches 300A, 400A are connected with the variable resistances $R_1$, $R_2$. Then, in shooting the scene at sunset, the R gain control circuit 8 and the B gain control circuit 9 have the respective gains controlled by manually regulating by the variable resistances $R_1$, $R_2$ indifferent of changing the connections of the system changeover switches 300, 400. In other words, in this embodiment, the inconvenience arising in shooting the scene at sunset can be avoided on preferential basis.

Figure 18A:
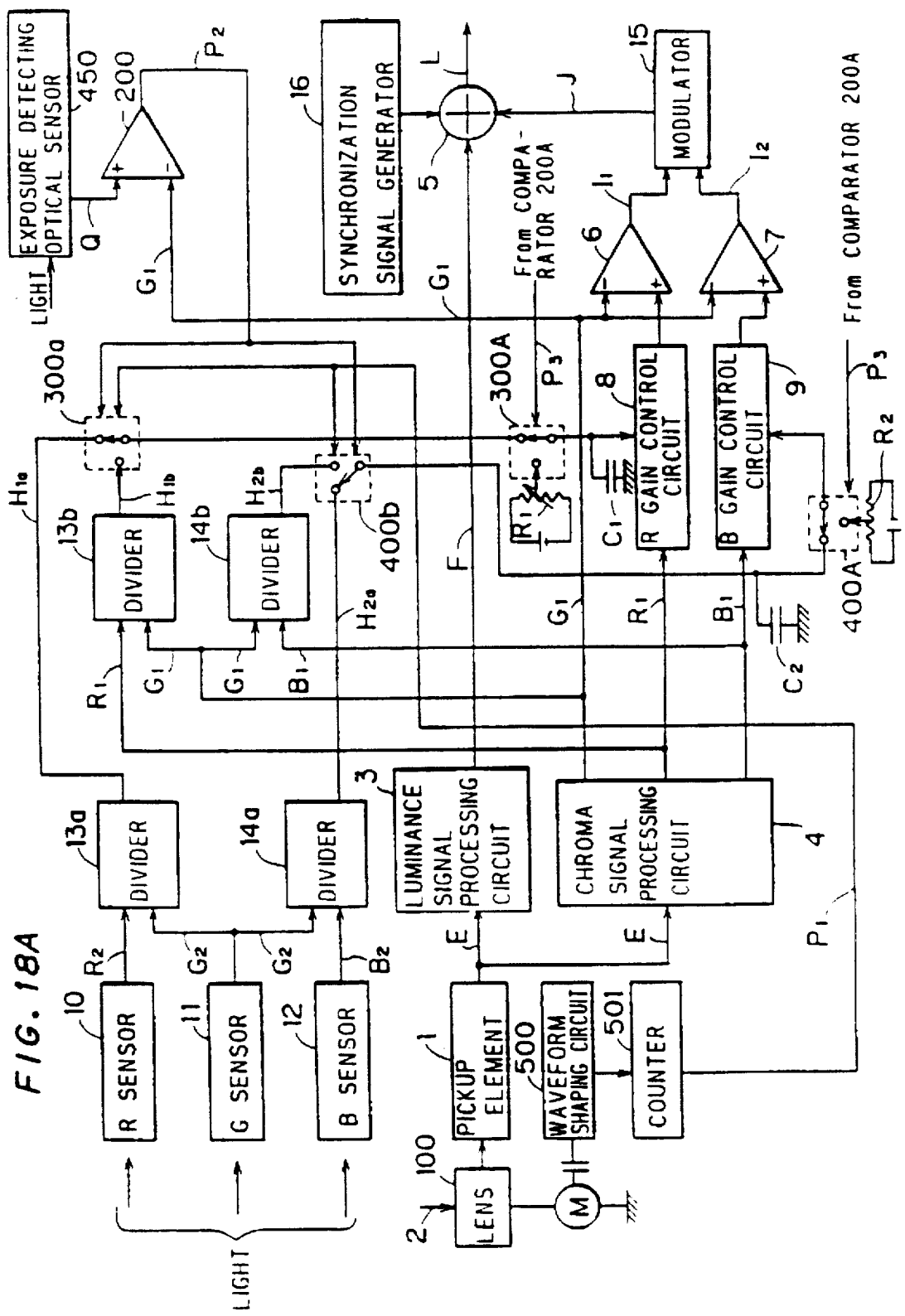

FIGS. 18A and 18B are block diagrams showing a twenty-third embodiment of the automatic white balance regulating device according to the present invention. FIGS. 18A and 18B together compose the automatic white balance regulating device. This embodiment is so structured that the inconvenience arising in shooting a scene of the outdoors from the room in day, the inconvenience arising in fully zooming in or out and the inconvenience arising in shooting a scene at sunset can be avoided. This embodiment is provided with a circuit to eliminate the inconvenience arising in shooting the scene at sunset, in addition to the embodiment in FIG. 14. Specifically, in this embodiment, the embodiment in FIG. 14 and the embodiment in FIG. 12 are combined with each other, where like circuits and elements in the embodiments are commonly used. Specifically, this embodiment is provided with the comparator 200A, the system changeover switches 300A, 400A, the variable resistances $R_1$, $R_2$, the comparator 200A, the divider 600 and the logarithmic converter 800 in addition to the embodiment in FIG. 14. These circuits and elements are connected with the embodiments shown in FIGS. 17A and 17B. Other components are the same as those in FIG. 14.

In shooting the scenes other than a scene at sunset, the rate of the red signal $R_2$ to the blue signal $B_2$ does not significantly change, and consequently, the system changeover signal $P_3$ turns "low" in level. In response to the "low", the system changeover switches 300A, 400A change the connections so as to be able to apply the white balance control signals $H_{1a}$, $H_{1b}$, $H_{2a}$, $H_{2b}$ to the R gain control circuit 8 and the B Gain control circuit 9. In this situation, in fully zooming in or out, or shooting a scene of the outdoors from the room in day, the system changeover switches 300a, 400b change the connections by the same operation as stated in the context of FIG. 14., and the same effects as in the embodiment in FIG. 14 can be obtained.

On the other hand, in shooting a scene at sunset, since the rate of the red signal $R_2$ significantly increases and the divider 600 significantly increases in its output level, as mentioned above, the system changeover signal $P_3$ turns "high" in level. In response to the "high", the system changeover switches 300A, 300B are connected with the variable resistances $R_1$, $R_2$. Then, in shooting the scene at sunset, the R gain control circuit 8 and the B gain control circuit 9 have the respective gains controlled by manually regulating the variable resistances $R_1$, $R_2$ indifferent switching the system changeover switches 300a, 400b. In other words, in this embodiment, the inconvenience arising in shooting the scene at sunset can be avoided on preferential basis.

Further, although this embodiment is so structured that the inconvenience arising in shooting a scene at sunset is avoided on preference basis, the system changeover switches 300a and 300A, and 300b and 300B may be reversed in order, whereby the inconvenience arising in shooting a scene of the outdoors from the room in day or the inconvenience arising in zooming in or out can be avoided on preferential basis.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. An automatic white balance regulating device built in an image pickup device for shooting an object and provided with a color temperature sensor system and a camera color signal processing system, comprising:

a plurality of color sensors receiving light around a place where said image pickup device is set in position to output a plurality of first color signals;

image pickup means for shooting said object to output a plurality of second color signals;

first control signal producing means for producing a first white balance control signal of said color temperature sensor system; using said first color signals;

second control signal producing means for producing a second white balance control signal of said camera color signal processing system, using said second color signals;

system selecting means for selecting said first white balance control signal when it is brighter around the place where said image pickup device is set in position than it is around said object, and selecting said second white balance control signal when it is not; and level regulating means for regulating a level of predetermined one of said second color signals in response to said first or second white balance control signal selected by said system selecting means;

said system selecting means comprising:

a comparator for receiving a specified one color signal within said plurality of first color signals and a specified one color signals within said plurality of second color signals to compare magnitudes thereof to output a system changeover signal in accordance with a comparison result, and a switch for receiving said first and second white balance control signals and said system changeover signal to selectively output said first or second white balance control signal in accordance with said system changeover signal.

2. An automatic white balance regulating device built in an image pickup device for shooting an object and provided with a color temperature sensor system and a camera color signal processing system, comprising:
- a plurality of color sensors receiving light around a place where said image pickup device is set in position to output a plurality of first color signals;
- image pickup means for shooting said object to output a plurality of second color signals;
- first control signal producing means for producing a first white balance control signal of said color temperature sensor system, using said first color signals;
- second control signal producing means for producing a second white balance control signal of said camera color signal processing system, using said second color signals;
- system selecting means for selecting said first white balance control signal when it is brighter around the place where said image pickup device is set in position than it is around said object, and selecting said second white balance control signal when it is not; and
- level regulating means for regulating a level of predetermined one of said second color signals in response to said first or second white balance control signal selected by said system selecting means;
- said system selecting means comprising:
  - a comparator for receiving a specified one color signal within said plurality of first color signals and a specified one color signals within said plurality of second color signals to compare magnitudes thereof to output a system changeover signal in accordance with a comparison result, and
  - a switch for receiving said plurality of first and second color signals and said system changeover signal to selectively output said plurality of first or second white balance control signals in accordance with said system changeover signal.

3. An automatic white balance regulating device built in an image pickup device for shooting an object and provided with a color temperature sensor system and a camera color signal processing system, comprising:
- a plurality of color sensors receiving light around a place where said image pickup device is set in position to output a plurality of first color signals;
- image pickup means for shooting said object to output a plurality of second color signals;
- first control signal producing means for producing a first white balance control signal of said color temperature sensor system, using said first color signals;
- second control signal producing means for producing a second white balance control signal of said camera color signal processing system, using said second color signals;
- system selecting means for selecting said first white balance control signal when it is brighter around the place where said image pickup device is set in position than it is around said object, and selecting said second white balance control signal when it is not; and
- level regulating means for regulating a level of predetermined one of said second color signals in response to said first or second white balance control signal selected by said system selecting means;
- said system selecting means comprising:
  - an exposure detecting optical sensor for detecting brightness around said image pickup device,
  - a comparator for receiving an output of said exposure detecting optical sensor and a predetermined one color signal within said plurality of second color signals to compare magnitudes thereof to output a system changeover signal in accordance with a comparison result, and
  - a switch for receiving said first and second white balance control signals and said system changeover signal to selectively output said first or second white balance control signal in accordance with said system changeover signal.

4. An automatic white balance regulating device built in an image pickup device for shooting an object and provided with a color temperature sensor system and a camera color signal processing system, comprising:
- a plurality of color sensors receiving light around a place where said image pickup device is set in position to output a plurality of first color signals;
- image pickup means for shooting said object to output a plurality of second color signals;
- first control signal producing means for producing a first white balance control signal of said color temperature sensor system, using said first color signals;
- second control signal producing means for producing a second white balance control signal of said camera color signal processing system, using said second color signals;
- system selecting means for selecting said first white balance control signal when it is brighter around the place where said image pickup device is set in position than it is around said object, and selecting said second white balance control signal when it is not; and
- level regulating means for regulating a level of predetermined one of said second color signals in response to said first or second white balance control signal selected by said system selecting means;
- said system selecting means comprising:
  - an exposure detecting optical sensor for detecting brightness around said image pickup device,
  - a comparator for receiving an output of said exposure detecting optical sensor and a predetermined one color signal within said plurality of second color signals to compare magnitudes thereof to output a system changeover signal in accordance with a comparison result, and
  - a switch for receiving said plurality of first and second color signals and said system changeover signal to selectively output said plurality of first or second color component signals in accordance with said system changeover signal.

5. An automatic white balance regulating device built in an image pickup device for shooting an object and provided with a color temperature sensor system and a camera color signal processing system, comprising:
- a plurality of color sensors receiving light around a place where said image pickup device is set in position to output a plurality of first color signals;
- image pickup means for shooting said object to output a plurality of second color signals including a luminance signal processing circuit for producing a luminance signal;
- first control signal producing means for producing a first white balance control signal of said color temperature sensor system, using said first color signals;
- second control signal producing means for producing a second white balance control signal of said camera color signal processing system, using said second color signals;

system selecting means for selecting said first white balance control signal when it is brighter around the place where said image pickup device is set in position than it is around said object, and selecting said second white balance control signal when it is not; and level regulating means for regulating a level of predetermined one of said second color signals in response to said first or second white balance control signal selected by said system selecting means;

said system selecting means comprising:

synthesizing means for synthesizing said plurality of first color signals to generate a brightness signal, a comparator for receiving said brightness signal and said luminance signal to compare magnitudes thereof to output a system changeover signal in accordance with a comparison result, and a switch for receiving said first and second white balance control signals and said system changeover signal to output said first or second white balance control signal in accordance with said system changeover signal.

6. An automatic white balance regulating device built in an image pickup device for shooting an object and provided with a color temperature sensor system and a camera color signal processing system, comprising:

a plurality of color sensors receiving light around a place where said image pickup device is set in position to output a plurality of first color signals;

image pickup means for shooting said object to output a plurality of second color signals including a luminance signal processing circuit for producing a luminance signal;

first control signal producing means for producing a first white balance control signal of said color temperature sensor system, using said first color signals;

second control signal producing means for producing a second white balance control signal of said camera color signal processing system, using said second color signals;

system selecting means for selecting said first white balance control signal when it is brighter around the place where said image pickup device is set in position than it is around said object, and selecting said second white balance control signal when it is not; and level regulating means for regulating a level of predetermined one of said second color signals in response to said first or second white balance control signal selected by said system selecting means;

said system selecting means comprising:

synthesizing means for synthesizing said plurality of first color signals to generate a brightness signal, a comparator for receiving said brightness signal and said luminance signal to compare magnitudes thereof to output a system changeover signal in accordance with a comparison result, and a switch for receiving said plurality of first and second color signals and said system changeover signal to selectively output said plurality of first or second color signals in accordance with said system changeover signal.

* * * * *